United States Patent
Christoudias et al.

(10) Patent No.: US 11,308,714 B1
(45) Date of Patent: Apr. 19, 2022

(54) ARTIFICIAL INTELLIGENCE SYSTEM FOR IDENTIFYING AND ASSESSING ATTRIBUTES OF A PROPERTY SHOWN IN AERIAL IMAGERY

(71) Applicant: Athenium LLC, Dover, NH (US)

(72) Inventors: Christos Marios Christoudias, Point Pleasant Beach, NJ (US); Ellen Dee Cousins, Rockville, MD (US); Ali Alhaj Darwish, Sterrett, AL (US)

(*) Notice: Subject to any disclaimer, the term of this patent is extended or adjusted under 35 U.S.C. 154(b) by 0 days.

(21) Appl. No.: 16/546,918

(22) Filed: Aug. 21, 2019

Related U.S. Application Data

(60) Provisional application No. 62/721,870, filed on Aug. 23, 2018.

(51) Int. Cl.
| | |
|---|---|
| G06V 20/10 | (2022.01) |
| G06F 17/15 | (2006.01) |
| G06K 9/62 | (2022.01) |
| G06N 3/04 | (2006.01) |

(52) U.S. Cl.
CPC ............ G06V 20/176 (2022.01); G06F 17/15 (2013.01); G06K 9/6267 (2013.01); G06N 3/0454 (2013.01)

(58) Field of Classification Search
CPC .... G06V 20/176; G06V 20/64; G06V 20/188; G06V 20/13; G06V 10/44; G06V 10/56; G06V 10/25; G06V 10/22; G06V 10/751; G06V 10/255; G06V 10/443; G06V 10/46; G06V 10/48; G06F 17/15; G06K 9/6267; G06K 9/6256; G06K 9/6271; G06K 9/00536; G06K 9/6221; G06K 9/6247; G06N 3/0454; G06T 2207/10032; G06T 2207/30184; G06T 2207/20081;
(Continued)

(56) References Cited

U.S. PATENT DOCUMENTS

| | | | |
|---|---|---|---|
| 8,655,070 B1 * | 2/2014 | Yang | G06K 9/00657 382/173 |
| 8,731,234 B1 * | 5/2014 | Ciarcia | G06K 9/4604 382/100 |
| 9,501,700 B2 * | 11/2016 | Loveland | G06F 3/04842 |

(Continued)

OTHER PUBLICATIONS

He, et al; "Mask R-CNN" Facebook AI Research: arXiv:1703.06870v3 [cs.CV] Jan. 24, 2018.
(Continued)

Primary Examiner — Michael S Osinski
(74) Attorney, Agent, or Firm — Woods, Herron and Evans LLP

(57) ABSTRACT

A computer-based method includes receiving, at a computer-based system, an aerial image of a property that includes a first visual indicator on the aerial image that follows and identifies a boundary line for the property; using a building rooftop Deep Fully Convolutional Network (DFCN), configured and trained to predict the presence of building rooftops in aerial imagery, to predict whether any building rooftops are present within the boundary line of the property based on the aerial image; and applying a second visual indicator to the aerial image to identify and outline a building rooftop in the aerial image identified by the building rooftop deep fully convolutional network. In some implementations, other Convolutional Networks (ConvNets) are used to predict other property attributes and characteristics.

29 Claims, 13 Drawing Sheets

(58) Field of Classification Search
CPC ... G06T 17/05; G06T 7/73; G06T 7/11; G06T 7/12; G06T 7/13
See application file for complete search history.

(56) References Cited

U.S. PATENT DOCUMENTS

| | | | |
|---|---|---|---|
| 9,679,227 B2* | 6/2017 | Taylor | G06K 9/00637 |
| 9,773,196 B2 | 9/2017 | Sachs et al. | |
| 9,875,509 B1* | 1/2018 | Harvey | G06T 17/20 |
| 10,217,236 B2* | 2/2019 | Kraft | G06K 9/4609 |
| 10,402,676 B2* | 9/2019 | Wang | G06K 9/00201 |
| 10,503,843 B2* | 12/2019 | Keane | G06Q 30/0611 |
| 10,607,362 B2* | 3/2020 | Kraft | G06K 9/6247 |
| 10,775,174 B2* | 9/2020 | Hofmann | G06K 9/00651 |
| 11,062,166 B2* | 7/2021 | Porter | G06K 9/00637 |
| 2008/0260237 A1* | 10/2008 | Savolainen | G06K 9/0063 382/154 |
| 2009/0252373 A1* | 10/2009 | Paglieroni | G06K 9/00637 382/103 |
| 2010/0179787 A2* | 7/2010 | Pershing | G06Q 40/08 702/156 |
| 2013/0226667 A1* | 8/2013 | Terrazas | G06Q 30/0205 705/7.34 |
| 2014/0067332 A1* | 3/2014 | Chen | G06F 30/13 703/1 |
| 2014/0237430 A1* | 8/2014 | Thornberry | G06K 9/00637 715/851 |
| 2015/0025914 A1* | 1/2015 | Lekas | G06K 9/00637 705/4 |
| 2015/0254800 A1* | 9/2015 | Johnson | G06Q 50/02 382/141 |
| 2015/0269598 A1* | 9/2015 | Terrazas | G06K 9/6202 705/7.34 |
| 2015/0347872 A1* | 12/2015 | Taylor | G06K 9/00637 382/224 |
| 2017/0007643 A1 | 1/2017 | Huang et al. | |
| 2017/0061625 A1 | 3/2017 | Estrada et al. | |
| 2017/0076438 A1* | 3/2017 | Kottenstette | G06K 9/627 |
| 2017/0083747 A1* | 3/2017 | Guan | G06K 9/0063 |
| 2017/0161559 A1* | 6/2017 | Du | G06K 9/00637 |
| 2017/0236024 A1* | 8/2017 | Wang | G06K 9/6221 382/201 |
| 2017/0287137 A1 | 10/2017 | Lin et al. | |
| 2017/0352100 A1* | 12/2017 | Shreve | G06K 9/4604 |
| 2018/0089763 A1* | 3/2018 | Okazaki | G06K 9/00671 |
| 2018/0089833 A1* | 3/2018 | Lewis | G06T 7/564 |
| 2018/0247416 A1* | 8/2018 | Ruda | G06T 7/0004 |
| 2019/0188516 A1* | 6/2019 | Porter | G06K 9/3233 |
| 2021/0042551 A1* | 2/2021 | Garcia | G06K 9/036 |
| 2021/0183045 A1* | 6/2021 | Iwasawa | G06K 9/00657 |

OTHER PUBLICATIONS

Hamaguchi, et al; "Effective Use of Dilated Convolutions for Segmenting Small Object Instances in Remote Sensing Imagery"; Pasco Corporation, Japan, Sep. 2017.

Yu, et al; "Multi-Scale Context Aggregation by Dilated Convolutions"; Published as a conference paper at ICLR 2016; arXiv:1511.07122v3 [cs.CV] Apr. 30, 2016.

Ronneberger, et al; U-Net: "Convolutional Networks for Biomedical Image Segmentation"; Computer Science Department and BIOSS Centre for Biological Signalling Studies, Germany; arXiv:1505.04597v1 [cs.CV] May 18, 2015.

Clevert, et al; "Fast and Accurate Deep Network Learning by Exponential Linear Units (ELUS)"; Published as a conference paper at ICLR 2016; arXiv:1511.07289v5 [cs.LG] Feb. 22, 2016.

Hien; "A guide to receptive field arithmetic for Convolutional Neural Networks"; ML Review; Apr. 2017.

Doukkali; "Batch normalization in Neural Networks"; Towards Data Science; Oct. 2017.

Cape Analytics; "Cape Analytics Launches AI-Driven, Property Intelligence Solution for Insurers Nationwide"; Business Wire; Apr. 3, 2018.

* cited by examiner

ARTIFICIAL INTELLIGENCE SYSTEM FOR IDENTIFYING AND ASSESSING ATTRIBUTES OF A PROPERTY SHOWN IN AERIAL IMAGERY

CROSS-REFERENCE TO RELATED APPLICATION(S)

This application claims the benefit of priority to U.S. provisional patent application Ser. No. 62/721,870, entitled ARTIFICIAL INTELLIGENCE SYSTEM FOR IDENTIFYING AND ASSESSING ATTRIBUTES OF A PROPERTY SHOWN IN AERIAL IMAGERY, which was filed on Aug. 23, 2018. The subject matter of the prior application is being incorporated herein by reference in its entirety.

FIELD OF THE INVENTION

This disclosure relates to an artificial intelligence system and, more particularly, relates to an artificial intelligence system for identifying and assessing attributes of a property shown in aerial imagery.

BACKGROUND

Insurance companies rely on thorough descriptions of the properties they insure in order to accurately underwrite and/or price policies. The information offered by property owners, and others, can be unreliable and/or incomplete. Furthermore, direct physical inspection of each property (via in-person visit) is prohibitively costly and difficult to perform at a large scale.

SUMMARY OF THE INVENTION

In one aspect, a computer-based method includes receiving, at a computer-based system, an aerial image of a property that includes a first visual indicator on the aerial image that follows and identifies a boundary line for the property; using a building rooftop Deep Fully Convolutional Network (DFCN), configured and trained to predict the presence of building rooftops in aerial imagery, to predict whether any building rooftops are present within the boundary line of the property based on the aerial image; and applying a second visual indicator to the aerial image to identify and outline a building rooftop in the aerial image identified by the building rooftop deep fully convolutional network.

In some implementations, other deep Convolutional Networks (ConvNets) are used to predict other property attributes and characteristics.

In certain exemplary implementations, the system uses Deep Convolutional Neural Network (DCNN) technology and Deep Fully Convolutional Networks (DFCN) technology. In a typically implementation, FCN is a network without fully connected layers (dense layers). FCN generally has the ability to compute non-linear filters and learn based on local spatial input. (J. Long, E. Shelhamer, and T. Darrell, *Fully Convolutional Networks for Semantic Segmentation*). Also DFCNs generally can process variable size images, unlike typical DCNNs. CNN may imply a network with learning filters between all layers even at the end of the network where decision making happens. CNNs tend to learn global information because the local spatial input is lost in the convolution. In certain implementations, DFCNs may be used for classifying and segmenting the following attributes: rooftop, in ground pool, above ground pool, trampoline, vegetation overhang, skylights, and solar panels. In certain implementations, DCNNs may be used for classifying (not segmenting) the following attributes: roof condition, roof material, and roof type.

In another aspect, a computer-based system is disclosed that, in various implementations, is configured to perform the processes disclosed herein. In an exemplary implementation, the system includes a network interface connection for receiving a plurality of aerial images from a data source over a network, wherein each image has a first visual indicator on the aerial image that follows and identifies a boundary line for the property; and a building rooftop deep fully convolutional network, configured and trained to predict the presence of building rooftops in aerial imagery, and apply a second visual indicator to the aerial image to identify and outline a building rooftop in the aerial image identified by the building rooftop deep fully convolutional network.

In some implementations, the computer-based system has a skylights deep fully convolutional network, configured and trained to predict whether there are any skylights on the building rooftop identified by the second visual indicator, and configured to apply a third visual indicator to the aerial image to identify and outline skylights identified by the skylights deep fully convolutional network on the building rooftop.

In some implementations, the computer-based system has a solar panels deep fully convolutional network, configured and trained to predict whether any solar panels are present on the building rooftop identified by the second visual indicator, and configured to apply a fourth visual indicator to the aerial image to identify and outline solar panels identified by the solar panels deep fully convolutional network on the building rooftop.

In some implementations, the computer-based system has a vegetation overhang deep fully convolutional network, configured and trained to predict whether any vegetation is overhanging the building rooftop identified by the second visual indicator, and configured to apply a fifth visual indicator to the aerial image to identify and outline vegetation overhang identified by the vegetation overhang deep fully convolutional network on the building rooftop.

In certain implementations, the skylights deep fully convolutional network, the solar panels deep fully convolutional network, and the vegetation overhang deep fully convolutional network have identical configurations but use different weights. For example, each of the skylights deep fully convolutional network, solar panels deep fully convolutional network, and vegetation overhang deep fully convolutional network may have: an encoder, a decoder, and a plurality of skip connections that extend from various points in the encoder to the decoder. The encoder may have an input, a normalization layer, and multiple (e.g., ten) processing segments. The decoder may have multiple (e.g., eight) processing segments and an output.

In a typical implementation, each of the processing segments in the encoder and decoder may have a convolution layer, a batch normalization layer; and an exponential linear unit (elu) layer. Every other processing segment in the encoder, starting with a second processing segment in the encoder, may have a max pooling layer.

In an exemplary implementation, each of the first two convolution layers in the encoder is associated with a feature vector that represents 32 features, each of the next two convolution layers in the encoder is associated with a feature vector that represents 64 features, each of the next two convolution layers in the encoder is associated with a feature vector that represents 128 features, each of the next two convolution layers in the encoder is associated with a feature vector that represents 256 features, and each of the next two convolution layers in the encoder is associated with a feature vector that represents 512 features. Moreover, in an exemplary implementation, each of the first two convolution layers in the decoder is associated with a feature vector that represents 256 features, each of the next two convolution layers in the decoder is associated with a feature vector that represents 128 features, each of the next two convolution layers in the decoder is associated with a feature vector that represents 64 features, and the last two dilated convolution layers in the decoder are associated with a feature vector that represents 32 features.

According to some implementations, a first of the skip connections extends from a point in the encoder just before a first of the max pooling layers to an output of a final processing segment in the decoder, a second of the skip connections extends from a point in the encoder just before a second of the max pooling layers to a point in the decoder just before a last two of the processing segments in the decoder, a third of the skip connections extends from a point in the encoder just before a third of the max pooling layers to a point in the decoder just before a last four of the processing segments in the decoder, and a fourth of the skip connections extends from a point in the encoder just before a last of the max pooling layers to a point in the decoder just after a first two of the processing segments in the decoder.

The computer-based system may, in some instances, further include a plurality of image classifiers, where each image classifier is configured to classify one or more attributes in the aerial image. The image classifiers may include a vegetation overhang classifier, a roof condition classifier, a roof material classifier, and/or a roof type classifier.

In some implementations, the computer-based system may include: a vegetation overhang deep fully convolutional network, a building rooftop staining deep convolutional neural network, a building rooftop surface deterioration deep convolutional neural network, a building rooftop material deep convolutional neural network, and/or a building rooftop type deep convolutional neural network, an above-ground pool rooftop deep fully convolutional network, an in-ground pool rooftop deep fully convolutional network, and/or a trampoline deep fully convolutional network.

Each of the above-ground pool deep fully convolutional network, the in-ground pool fully convolutional network, and the trampoline deep fully convolutional network may include: an encoder, a decoder, and a plurality of skip connections that extend from various points in the encoder to the decoder. The encoder may have: an input, a normalization layer, and multiple (e.g., ten) processing segments. The decoder may have: multiple (e.g., eight) processing segments and an output. Every processing segment in the encoder and decoder may include a convolution layer, a batch normalization layer, and an exponential linear unit (elu) layer, and every other processing segment in the encoder, starting with a second processing segment in the encoder, may have a max pooling layer. In an exemplary implementation, each of the first two convolution layers in the encoder is associated with a feature vector that represents 16 features, each of the next two convolution layers in the encoder is associated with a feature vector that represents 32 features, each of the next two convolution layers in the encoder is associated with a feature vector that represents 64 features, each of the next two convolution layers in the encoder is associated with a feature vector that represents 128 features, each of the next two convolution layers in the encoder is associated with a feature vector that represents 256 features. Moreover, in an exemplary implementation, each of the first two convolution layers in the decoder is associated with a feature vector that represents 128 features, each of the next two convolution layers in the decoder is associated with a feature vector that represents 64 features, each of the next two convolution layers in the decoder is associated with a feature vector that represents 32 features, and the last two dilated convolution layers in the decoder are associated with a feature vector that represents 16 features. Additionally, in an exemplary implementation, a first of the skip connections extends from a point in the encoder just before a first of the max pooling layers to an output of a final processing segment in the decoder, a second of the skip connections extends from a point in the encoder just before a second of the max pooling layers to a point in the decoder just before a last two of the processing segments in the decoder, a third of the skip connections extends from a point in the encoder just before a third of the max pooling layers to a point in the decoder just before a last four of the processing segments in the decoder, and a fourth of the skip connections extends from a point in the encoder just before a last of the max pooling layers to a point in the decoder just after a first two of the processing segments in the decoder.

In a typical implementation, the computer-based system further includes a computer-based user terminal configured to enable a first human annotator to annotate the received image, at a computer-based user terminal, to specify whether visual inspection by the first human annotator revealed, in the aerial image, any building rooftops, in-ground pools, above-ground pools, trampolines, skylights, solar panels, vegetation overhang, staining, surface deterioration, specific roof materials, and/or specific roof types. The system may, in certain implementations, be configured to compare the annotation(s) made by the first human annotator to any determinations or predictions made by the computer-based system, and, if the comparison reveals a discrepancy between the annotations made by the first human annotator and the determinations or predictions made by the computer-based system, present the aerial image to a second human annotator who is different than the first human annotator.

In an exemplary implementation, the building rooftop deep fully convolutional network includes an encoder, a decoder, and a plurality of skip connections that extend from various points in the encoder to the decoder. The encoder may have an input, a normalization layer, and multiple (e.g., ten) processing segments. The decoder may have multiple (e.g., eight) processing segments and an output. Every processing segment in the encoder and decoder may include a dilated convolution layer, a batch normalization layer; and an exponential linear unit (elu) layer, and every other processing segment in the encoder, starting with a second processing segment in the encoder, may have a max pooling layer. In an exemplary implementation, each of the first two dilated convolution layers in the encoder is associated with a feature vector that represents 64 features and a 2×2 dilation kernel, each of the next two dilated convolution layers in the encoder is associated with a feature vector that represents 128 features and a 4×4 dilation kernel, each of the next two dilated convolution layers in the encoder is associated with a feature vector that represents 256 features and an 8×8 dilation kernel, each of the next two dilated convolution layers in the encoder is associated with a feature vector that represents 512 features and a 16×16 dilation kernel, each of the next two dilated convolution layers in the encoder is associated with a feature vector that represents 1024 features using a 32×32 dilation kernel. Moreover, in an exemplary implementation, each of the first two dilated convolution layers in the decoder is associated with a feature vector that represents 512 features and a 16×16 dilation kernel, each of the next two dilated convolution layers in the decoder is associated with a feature vector that represents 256 features and a 8×8 dilation kernel, each of the next two dilated convolution layers in the decoder is associated with a feature vector that represents 128 features and a 4×4 dilation kernel, and the last two dilated convolution layers in the decoder are associated with a feature vector that represents 64 features and a 2×2 dilation kernel. Additionally, in an exemplary implementation, a first of the skip connections extends from a point in the encoder just before a first of the max pooling layers to an output of a final processing segment in the decoder, a second of the skip connections extends from a point in the encoder just before a second of the max pooling layers to a point in the decoder just before a last two of the processing segments in the decoder, a third of the skip connections extends from a point in the encoder just before a third of the max pooling layers to a point in the decoder just before a last four of the processing segments in the decoder, and a fourth of the skip connections extends from a point in the encoder just before a last of the max pooling layers to a point in the decoder just after a first two of the processing segments in the decoder.

While separate DFCNs may be used for classifying and segmenting attributes in a property parcel, some of these attributes could be segmented with one DFCN.

In some implementations, one or more of the following advantages are present.

For example, in some implementations, the systems and techniques disclosed herein help produce reliable, complete descriptions of property attributes and conditions for a large number of properties in a very cost-effective manner. In some implementations, the systems and techniques disclosed herein may facilitate ensuring the accuracy and reliability of annotations made on aerial images by human annotators, thus, making those annotations easier to rely upon. Moreover, in some implementations, the systems and techniques disclosed herein may perform direct annotation, without involvement of a human annotator—resulting in fast and highly cost-effective annotation of many aerial images. This information can be provided to insurance companies, and others, who rely on thorough and accurate property descriptions to make important, real world decisions such as underwriting and/or pricing of insurance policies.

Other features and advantages will be apparent from the description and drawings, and from the claims.

BRIEF DESCRIPTION OF THE DRAWINGS

Like reference characters refer to like elements.

DETAILED DESCRIPTION

Figure 1:
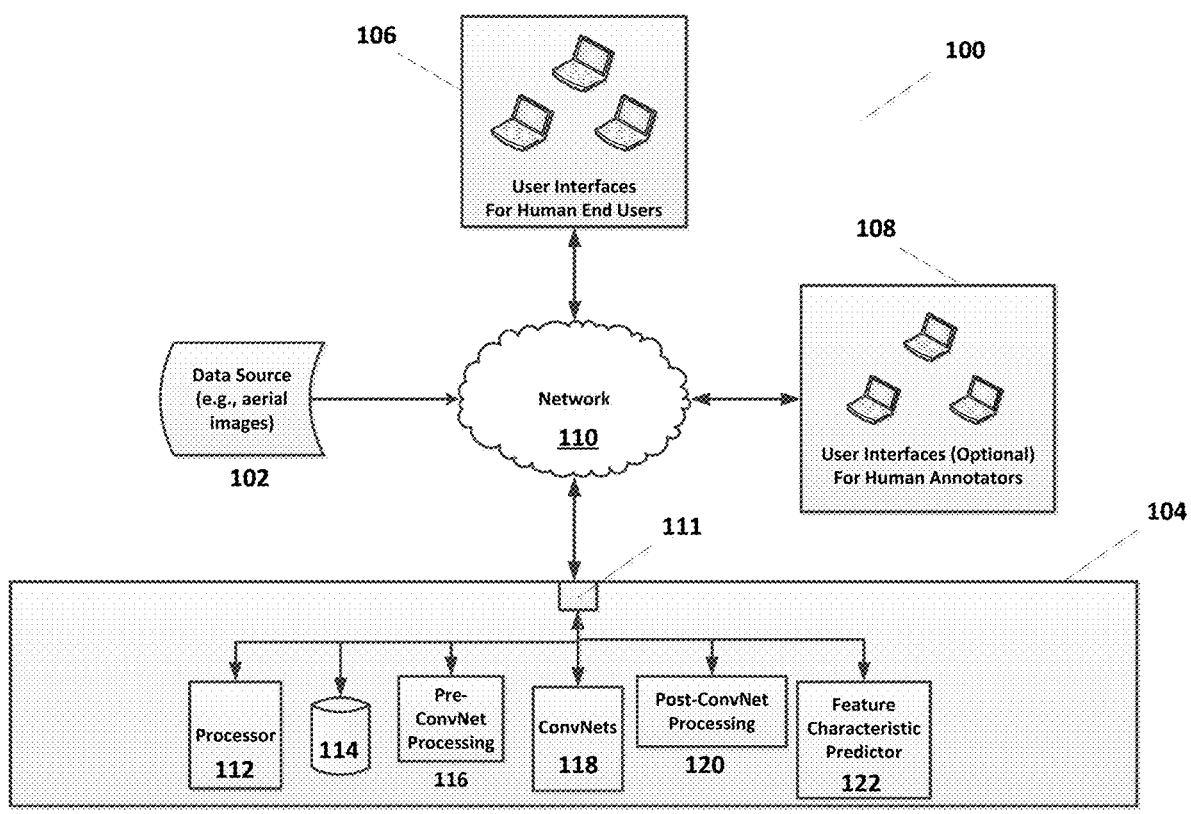
FIG. 1 is a schematic representation showing an exemplary implementation of a system configured to automatically identify attributes of physical properties based on aerial images of the properties.

FIG. 1 is a schematic representation showing an exemplary implementation of a system 100 configured to automatically identify attributes of physical properties based on aerial images of the properties. In some implementations, for each physical property, the system 100 is able to identify the presence of, distinguish between, and identify an outline on the aerial image for any building rooftops, above ground pools, in ground pools, trampolines, skylights, solar panels, and/or vegetation that overhangs a rooftop based on the aerial images. Moreover, in some implementations, for each physical property, the system 100 is configured to classify any vegetation that overhangs any rooftops, the condition of any rooftops, any rooftop materials, and/or roof types, again, based on the aerial images of the properties.

In some implementations, the system 100 can be adapted to output its determinations directly to human end users. In some implementations, the system 100 can be adapted to utilize its determinations to automatically check any annotations made on an aerial image by a human annotator tasked with viewing each aerial image and entering into the system data that identifies or classifies any attributes (e.g., building rooftops, above ground pools, in ground pools, trampolines, skylights, solar panels, vegetation that overhangs a rooftop, rooftop conditions, rooftop materials, and/or roof types) that the human annotator sees in the aerial image. Potentially, the system 100 can have a wide variety of useful applications. In one exemplary implementation, an insurance company might use the system 100 to help ensure that any descriptions of insured properties—commercial or residential—are complete and accurate. This ensures that the policies offered and/or applied to each property are appropriately underwritten and/or priced. Typically, these advantages can be accomplished on a large scale in a highly cost-effective manner.

The system 100, according to the illustrated implementation, includes a data source 102 (i.e., a source of aerial images), a computer-based processing system 104, a plurality of computer-based user interface devices 106 for human end users of the system, and a plurality of computer-based user interface devices 108 for human annotators. These system components are connected together via a computer network 110 (e.g., the Internet).

The data source 102 is configured to provide the aerial images of the properties. The data source 102 can be essentially any kind of system, device or service that is able to provide aerial images, in electronic form, of the properties.

In one exemplary implementation, the data source 102 may include a cloud subscription service from Nearmap Ltd./Nearmap US, Inc. (hereinafter "Nearmap"). Nearmap operates a camera system and software pipeline to capture aerial photos, stitch them together into digital maps, and publish the content online quickly. Nearmap generally provides its high-resolution aerial imagery content (that may be geo-coded) as a subscription service to its customers. The images and associated content are quickly processed and streamed to the cloud, where they are available for viewing and analysis. The Nearmap aerial imagery can be accessed through a cloud-based interface called MapBrowser™ or through API integrations.

In some implementations, the aerial imagery produced by the data source 102 includes aerial images of physical properties that have lines that demarcate the boundaries of each physical property. In various implementations, the data source may be, include, or utilize satellites, Google maps, and/or drones.

The aerial images typically travel through the network 110 in an electronic data format that represents the aerial images.

The computer-based processing system 104 is configured to analyze the aerial images it receives to identify the presence of, and distinguish between, various attributes represented in those images. In some implementations, the computer-based processing system 104 is also configured to produce an outline on the images to delineate the borders of any of the identified attributes.

The illustrated computer-based processing system 104 has a network interface 111, a plurality of highly specialized deep Convolutional Networks (ConvNets) 118, a pre-ConvNet processing module 116, a post-ConvNet processing module 120, a feature characteristic predictor 122, a general purpose computer-based processor 112, and a computer-based memory 114.

The network interface 111 is essentially the point of interconnection between the computer-based processing system 104 and the network 110. In some implementations, the network interface 111 is a network interface card (NIC). In some implementations, the network interface is implemented via software executing on a processor (e.g., processor 112). The network interface 111 is configured to receive data including, for example, data representing the aerial images from the data source 102, and other requests, etc. from other parts of the system 100. The network interface 111 is further configured to transmit data including, for example, data identifying the presence of building rooftops, above ground pools, in ground pools, trampolines, skylights, solar panels, and/or vegetation that overhangs a rooftop represented in the aerial images.

In the illustrated implementation, the ConvNets 118 are configured and trained to identify the presence of, and distinguish between, various attributes represented in the aerial images that are passed through the ConvNets. In an exemplary implementation, the ConvNets 118 include a set of DFCNs that are configured and trained to identify the presence of, and distinguish between, above ground pools, in ground pools, trampolines, and building rooftops. Moreover, in an exemplary implementation, the ConvNets 118 include segmentation DFCNs configured and trained to identify the presence of, and distinguish between, skylights, solar panels, and vegetation overhang for an identified building rooftop. Moreover, in an exemplary implementation, the ConvNets 118 include classification DCNNs configured and trained to identify the presence of, and distinguish between, staining and surface deterioration for an identified building rooftop. Moreover, in an exemplary implementation, the ConvNets 118 include DCNNs configured to identify the presence of, and distinguish between roof materials and roof types.

The pre-ConvNet processing module 116 includes one or more computer-based components (either hardware or software executing on a processor) configured to process the aerial images prior to being inputted to the ConvNets 118. In a typical implementation, this pre-ConvNet processing facilitates the processing that is later performed by the ConvNets 118. In one exemplary implementation, the pre-ConvNet processing module 116 is configured to mask and crop and/or resize the images, as appropriate. In this regard, in a typical implementation, the masking essentially darkens every pixel in an image that falls outside the property line of a property of interest. In a typical implementation, the masking, in this regard, helps ensure that only the property of interest remains and that all other properties are excluded. Moreover, in a typical implementation, cropping of the image isolates the remaining portions of the image (i.e., the pixels that have not been darkened) to make them as large as practical to facilitate accuracy in any determinations made by the ConvNets 118 and resizing scales the image to a canonical input image size.

The ConvNets 118 include multiple convolutional networks, each of which is specifically configured and trained to identify particular types of attributes that may be present in the aerial images. In one exemplary implementation, the ConvNets 118 include three separate DFCN architectures used to implement 7 DFCNs: 1) a building rooftop segmentation network architecture, 2) an above ground pool, in-ground pool, and trampoline segmentation network architecture, and 3) a solar panel, skylights, and vegetation overhang segmentation network architecture. In this kind of implementation, the building rooftop segmentation network is configured to identify any building rooftops in the aerial images; the above ground pool, in-ground pool, and trampoline segmentation networks are configured to identify any above ground pools, in-ground pools, or trampolines in the aerial images; and the solar panel, skylights, and vegetation overhang segmentation networks are configured to identify any solar panel, skylights, and vegetation overhang in the aerial images.

In a typical implementation, Deep Fully Convolution Networks (DFCNs) are used to segment property attributes and Deep Convolutional Neural Networks (DCNNs) are used to classify their characteristics. A DCNN is a feed-forward artificial neural network that consists of an input and output layer, as well as multiple hidden layers. The hidden layers may include, for example, convolutional layers, pooling layers, activation layers, fully connected layers and/or normalization layers. The DCNN takes a fixed size image input and employs fully connected layers to classify the image. A Deep Fully Convolutional neural Network (DFCN) is an artificial neural network with an encoder-decoder architecture. It consists of layers that implement dot product operations, batch normalization, maxpooling, and element wise activation functions. The fully connected layers that are commonly found in DCNNs are replaced with learning filters in DFCNs. The DFCN accepts variable size input and produces a pixel-wise segmentation. DFCNs have the ability to compute non-linear filters and learn based on local spatial input.

The DCNNs and DFCNs learn to identify their associated attributes by learning representations from the training data, generally without being programmed with any rules that are specific to identifying those specific attributes. For example, the building rooftop segmentation network learns, via training, to identify images that contain building rooftops by analyzing example images whose pixels have been manually labeled (e.g., by a human user) as either "building rooftop" or "no building rooftop" and using the results to identify building rooftops in other images. The building rooftop segmentation network does this without any prior knowledge about building rooftops, e.g., what shapes are typical for a roof, what optical characteristics are typical for a roof, etc. Instead, they automatically generate identifying characteristics from the learning materials that they process during training.

In a typical implementation, the input to each ConvNet 118 is a masked and resized version of the original aerial image, and the output of each ConvNet 118 is either a list of image class probabilities or a probability image, which is a gray scale version of the original image and represents the probability that each respective pixel in the original image represents a particular attribute. The probability image is essentially a modified version of the input image where the overall size of and shapes on the probability image correspond to the overall size of and shapes in the original input image, but each pixel in the probability image visually represents a probability that the attribute of interest (e.g., a building rooftop) was present at the corresponding pixel in the input image. So, for a particular input image, the output of the building rooftop segmentation network may be a color-coded image, where whiter pixels correspond to locations in the input image where a rooftop is more probably present and darker pixels correspond to locations in the input image where a rooftop is less probably present.

The post-ConvNet processing module 120 includes one or more computer-based components (either hardware or software executing on a processor) configured to process the outputs from the DCNNs and DFCNs. In a typical implementation, this post-ConvNet processing results in an annotated version of original aerial image identifying the attribute of interest. In one exemplary implementation, the post-ConvNet processing module 120 is configured to threshold and resize the probability images that are produced by the DFCNs in ConvNets 118.

In a typical implementation, thresholding refers essentially to the process of determining, for each pixel in a probability image, whether the indicated probability exceeds a threshold (indicating that a building rooftop is present) or not (indicating that a building rooftop is not present). In one exemplary embodiment of thresholding, the post-ConvNet processing module 120 replaces each pixel in the probability image with a black pixel if the image intensity is less than some fixed threshold T, or a white pixel if the image intensity is greater than the threshold T. This results in dark portions of the probability image (darker than the threshold) becoming completely black, and lighter portions of the probability image (lighter than the threshold) becoming completely white.

In a typical implementation, the resizing performed by the post-ConvNet processing module 120 resizes the probability image or the thresholded version of the probability image to match the dimensions of the original aerial image that was inputted to the computer-based processing unit 104.

In a typical implementation, the computer-based processing system 104 uses the thresholded, resized version of the probability image to identify the pixels in the original aerial image that correspond to the attributes of the physical property identified by the DFCNs in the ConvNet module 118. In some implementations, the computer-based processing system 104 may accomplish this by effectively superimposing the thresholded, resized version of the probability image over the original aerial image of the physical property and then drawing a line at the barrier between the above-threshold portions of the probability image (e.g., building rooftops) and the below-threshold portions of the probability image. The computer-based processing system 104 may then remove the thresholded, resized version of the probability image, leaving the line in place. This results in a modified version of the original aerial image with a line that outlines the attributes of interest in the physical property.

The foregoing process can be performed by more than one of the DFCNs to produce a version of the aerial image that includes multiple lines outlining different attributes of interest in the physical property. In various implementations, the processing by the different DFCNs can be performed in any order or in parallel.

The feature characteristic predictor 122 is configured to predict various characteristics of the attributes identified by the ConvNet module 118. In one exemplary implementation, the feature characteristic predictor 122 is configured to classify one or more (or all) of the following: 1) building rooftop condition (e.g., good, fair, or poor), 2) vegetation overhang above a building rooftop (e.g., none, low, medium, or high), 3) primary and secondary roof material(s) (e.g., gravel, metal, asphalt, shingle, tile, or other), and 4) primary and secondary roof type(s) (e.g., flat, gable, gambrel, hip, mansard, shed, or other).

In a typical implementation, the feature characteristic predictor 122 includes one or more classifier modules—typically one single separate classifier module for each area of classification—and associated processing functionalities to perform calculations, apply decision tree logic, and make selections, as disclosed herein.

According to one exemplary implementation, the feature characteristic predictor 122 includes a vegetation overhang classifier, a building rooftop condition classifier, a building rooftop material(s) classifier, and a building rooftop type(s) classifier. In such an implementation, the building rooftop condition classifier may be configured to: 1) identify a probability of staining and/or surface deterioration for each building rooftop identified by the ConvNets 118 2) calculate, based on the identified probability(ies), a disrepair index for each rooftop, and 3) classify the overall condition of each building rooftop identified by the ConvNets 118 (e.g., using decision-tree logic) as good, fair, or poor. Moreover, in such an implementation, the vegetation overhang classifier may be configured to: 1) calculate an area (e.g., in square pixels) for each building rooftop identified by the DFCN in ConvNets 118, 2) calculate an area (e.g., in square pixels) of the building rooftop that is covered by vegetation for each building rooftop identified by the DFCN in ConvNets 118 as having vegetation overhang, 3) calculate a percentage of the building rooftop that is covered by the vegetation, and 4) classify the degree to which vegetation overhangs each rooftop identified by the DFCN in ConvNets 118 as none, low, medium, or high. Moreover, in such an implementation, the roof material(s) classifier may be configured to 1) determine, with the ConvNets 118, a probability that each building rooftop has different materials (e.g., gravel, metal, asphalt, shingle, tile, or other), and 2) select from among these different materials, the top one or two materials having the highest probabilities. Moreover, in such an implementation, the roof type(s) classifier may be configured to 1) determine, with the ConvNets 118, a probability that each building rooftop has different type (e.g., flat, gable, gambrel, hip, mansard, shed, or other), and 2) select from among these different roof types, the top one or two roof types having the highest probabilities.

In a typical implementation, some (or all) of the classifiers have their own DCNN(s) and may have access to processing capabilities from its own internal computer-based processor (s) and/or the system's processor 112. In a typical implementation, the DCNN in each of the classifiers is configured to determine a probability that a particular characteristic (e.g., the presence of rooftop staining, rooftop surface deterioration, particular rooftop materials, particular rooftop types, etc.) is present in the attributes of the physical properties shown in the aerial images.

In a typical implementation, the processing capabilities associated with at least some of the classifiers calculate one or more indices (e.g., a building rooftop disrepair index, a percentage of rooftop area covered by vegetation overhang, etc.) associated with the corresponding characteristic some of which are based on the probability(ies) calculated by the DCNN(s) in the classifiers.

Additionally, in a typical implementation, the processing capabilities associated with at least some of the classifiers determine a condition of one of the attributes in the aerial image (e.g., the degree of vegetation overhang for a building rooftop, the condition of a building rooftop, the material(s) of a building rooftop, and the type(s) of a building rooftop). These additional processing capabilities may include, for example, applying decision-tree-based logic or selection-based logic to the probability determinations made by the DCNN(s) in the classifiers.

Generally speaking, a decision tree is a flowchart-like structure in which each internal node represents a "test" on an attribute (e.g. whether a coin flip comes up heads or tails), each branch represents the outcome of the test, and each leaf node represents a class label (decision taken after computing all attributes). The paths from root to leaf represent classification rules. Thus, in a typical implementation, the decision-tree-based logic that the system 100 applies to the probability determinations made by the DCNN(s) in the classifiers essentially apply class labels (e.g., building rooftop condition=good) based on the path that applies to each probability determination from root to leaf in the classification rules represented by the decision-tree-based logic.

Generally speaking, selection-based logic makes a selection among available alternative conclusions. For example, the selection-based logic that the system 100 applies to the probability determinations made by the DCNN(s) in the classifiers may select certain members of a particular group (e.g., the two possible roof materials identified by a classifier's DCNN that have the highest probabilities that are greater than 50%).

In a typical implementation, the general purpose computer-based processor 112 is configured to perform any functionalities of the computer-based processing system 104 that are not otherwise attributed to another component of the computer-based processing system, and to perform any other functionalities that may help facilitate or support functionalities of the other components of the computer-based processing system 104. In a typical implementation, the computer-based memory 114 is configured to, and does, store instructions executable by one or more processors (including, e.g., processor 112) to perform any steps attributable to the computer-based processing system 104. In a typical implementation, the processor 112 includes one or more graphics processing units (GPU(s)).

Figure 2:
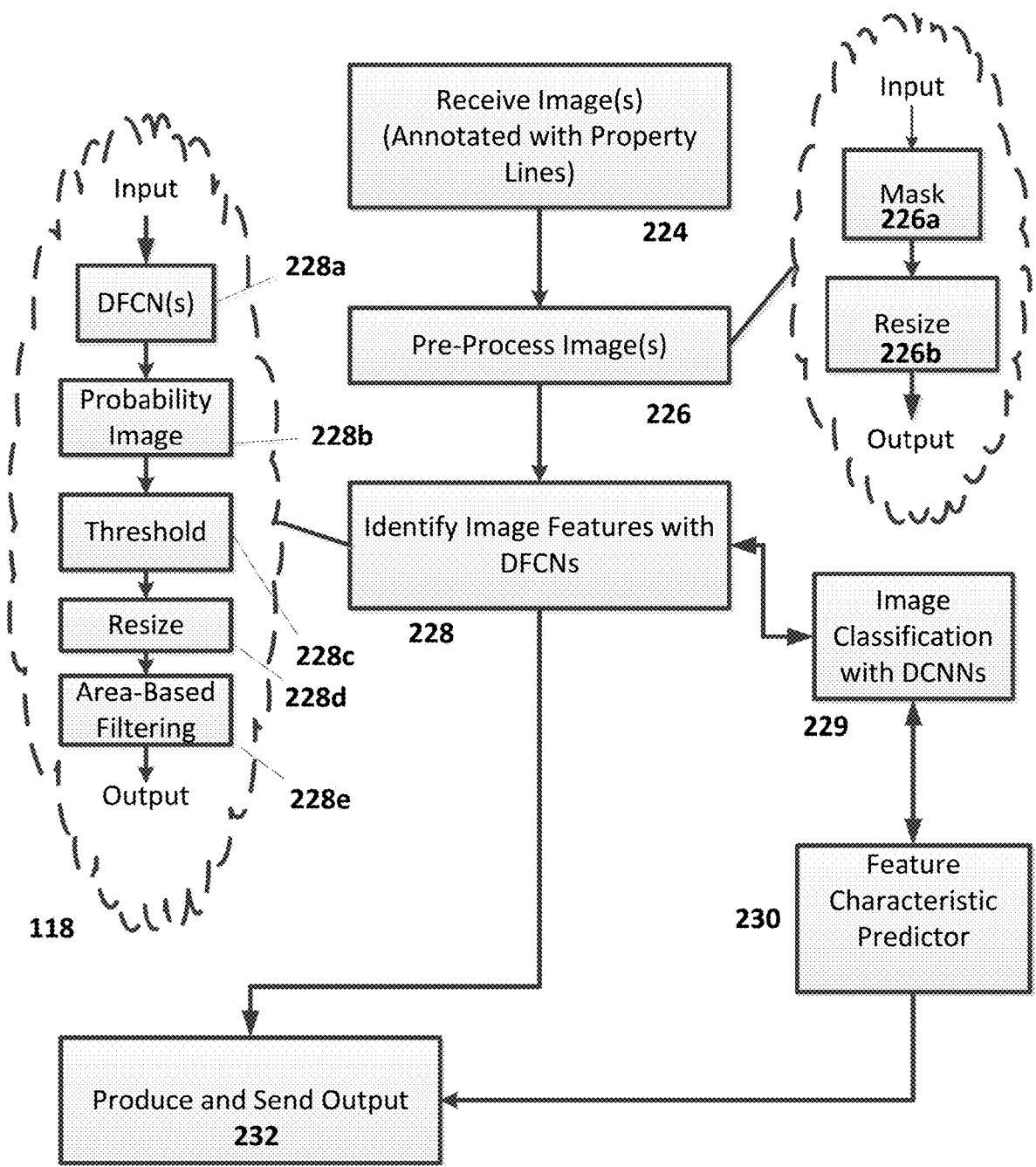
FIG. 2 is a flowchart that represents an exemplary implementation of a method that may be performed by the system of FIG. 1.

FIG. 2 is a flowchart that represents an exemplary implementation of a method that may be performed by the system 100 of FIG. 1.

According to the illustrated implementation, the system 100 (at 224) receives aerial images (typically annotated to identify one or more property lines in the image).

Next, according to the illustrated implementation, the system 100 (at 226) pre-processes the received aerial images. This pre-processing can include, for example, masking the images (at 226a) and resizing the images (at 226b).

Next, in the illustrated implementation, the system 100 (at 228) identifies attributes shown in the aerial images with the system's ConvNets. This image identification can include, for example, applying the pre-processed images to the DFCNs (at 228a) to produce a probability image (at 228b), then thresholding the probability image (at 228c), resizing the probability image (at 228d) so that it can be used to overlay boundaries of the identified structure on the original aerial image, and performing area-based filtering (at 228e) to remove small spurious regions.

In some implementations, the system 100 (at 232) produces and sends an output (e.g., to one or more computer-based user interfaces 106, 108) based simply on this identification of attributes shown in the aerial images. The output, in this regard, may be a version of original aerial image(s), annotated to show the boundaries (and, optionally, labels) of any attributes in the original aerial images that have been identified by the DFCNs (in 228).

The system 100 may proceed to image classification with DCNN(s) (at 229), and feature characteristic prediction (at 230). In some implementations, this direct classification information may be output by the system 100 (e.g., sent to one or more of the computer-based user interfaces 106, 108).

Figure 3:
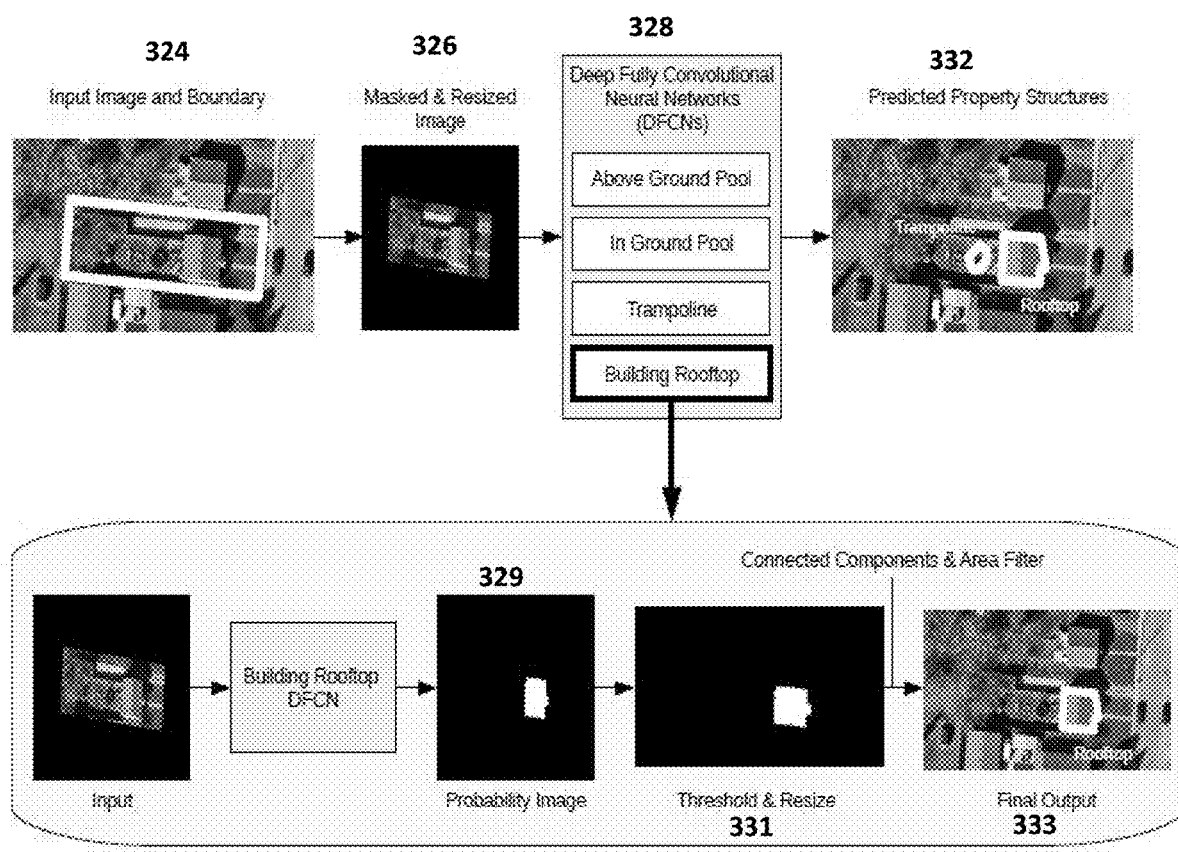
FIG. 3 is a schematic representation showing an exemplary implementation of a process performed by the system of FIG. 1.

FIG. 3 is a schematic representation showing one exemplary implementation of a process performed by the system 100 of FIG. 1.

According to the illustrated process, the system 100 (at 324) receives an input image that includes an annotated property boundary. The illustrated image is an aerial image (e.g., one taken by a plane, drone, crane, etc.) of a particular property (enclosed by the indicated boundary lines) and some area beyond the property's boundary lines. The enclosed property has one house and a trampoline. The indicated boundary lines identify the legal extent of the homeowner's property, i.e., where the homeowner's property ends and an adjacent property begins.

Next (at 326), according to the illustrated process, the system 100 masks and resizes the image. The masking essentially darkens all of the pixels in the original aerial image that fall outside of the indicated boundary lines. The resizing is performed to make the masked version of the image a size that will match the size of the convolution layers of the DFCNs. This size was configured to maximize the segmentation accuracy and minimize training and inference time.

Next (at 328), the masked, resized version of the aerial image is applied to one or more DFCNs including, according to the illustrated implementation, a Building Rooftop DFCN that is configured and specifically trained to identify building rooftops. In the illustrated implementation, the Building Rooftop DFCN essentially uses the input image (i.e., the masked & resized version of the aerial image) to create a probability image 329.

The probability image, in the illustrated implementation, represents the probability that a building rooftop is shown in the masked & resized version of the aerial image, on a pixel-by-pixel basis. These probabilities are represented as shading (from very light, which represents high probabilities, to very dark, which represents low probabilities). More particularly, in the illustrated probability image, the lighter the pixel the more probable it is that a corresponding pixel in the masked & resized version of the aerial image shows a building rooftop. Conversely, in the illustrated probability image, the darker the pixel the less probable it is that a corresponding pixel in the masked & resized version of the aerial image shows a building rooftop. Pixels that are between very light and very dark (e.g., gray pixels) may correspond to pixels in the masked & resized version of the aerial image that the Building Rooftop DFCN could not identify, with a high probability, as being part of a building rooftop or not.

Next, according to the illustrated implementation, the system 100 (at 331) thresholds the probability image. As mentioned above, thresholding involves determining, for each pixel in the probability image, whether the indicated probability exceeds a particular threshold (indicating that a building rooftop is present) or not (indicating that a building rooftop is not present). In one exemplary embodiment of thresholding, the post-ConvNet processing module 120 replaces each pixel in the probability image with a black pixel if the image intensity is less than some fixed threshold probability (e.g., 50%), or a white pixel if the image intensity is greater than or equal to the threshold probability (e.g., 50%). After thresholding, any dark portions of the probability image (darker than the threshold) typically become more black (e.g., completely black), and any lighter portions of the probability image (lighter than the threshold) become more white (e.g., completely white).

Next, according to the illustrated implementation, (also at 331), the system resizes the thresholded probability image (e.g., back to a size that corresponds to the original image size). This allows the system 100 to use the resulting thresholded & resized probability image (331) to produce a final output image 333 that is essentially a version of the original aerial image, with a boundary identifying an outline of the building rooftop (identified by the Building Rooftop DFCN) superimposed on the original aerial image. According to the illustrated implementation, the system 100 utilizes connected components analysis to group pixels together into regions and then uses an area filter to remove regions whose area is less than the threshold. In a typical implementation, connected components employs a parent-child hierarchy to group image pixels into regions according to their assigned class labels, whereby big regions are considered parents and small connected or neighboring ones, that are smaller in size, are considered their children. This hierarchical approach groups high probability regions into bigger ones that are provided as input to area based filtering. The area of each object is estimated by converting the predictions in the post processed image into polygons and computing their area. A threshold is then applied to remove the predicted objects whose areas are below a threshold and are not identified as children of a parent, in order to keep objects most likely to be a predicted property structure (e.g., a building rooftop) and eliminating objects that are most likely to instead be noise. The threshold is determined statistically after testing and analyzing many predictions. This produces the final output image 333.

Therefore, the final output image 333, according to the illustrated implementation, is an annotated version of the original aerial image annotating a predicted property structure (e.g., a building rooftop outline).

In a typical implementation, the foregoing processes may be performed on a particular image multiple times—one time for each respective one of the DFCNs 328—to look for, and annotate as appropriate, above ground pools, in ground pools, and trampolines. As a result, for the image shown, which again has a building rooftop and a trampoline, the system 100 might end up producing one or more outputs that indicate and outline/annotate that the property shown in the original image has a building rooftop and a trampoline. Since the original image does not have an above- or in-ground pool, the system 100 would not indicate that an above- or in-ground pool are present. Moreover, in some implementations, the system 100 might specifically note (e.g., in an output provided to a computer-based user interface) that the system did not find any above- or in-ground pools on the associated property.

Figure 4:
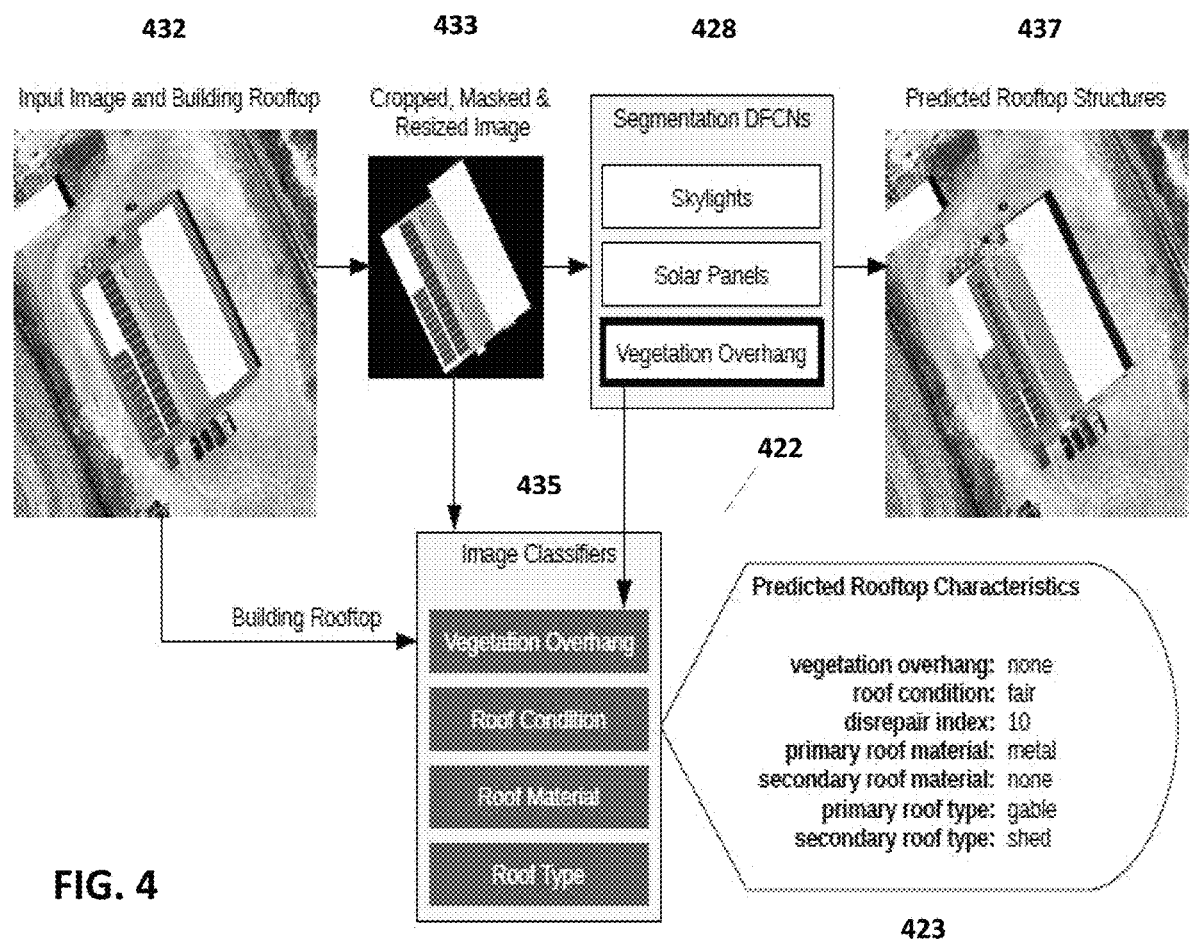
FIG. 4 is a schematic representation showing an exemplary implementation of another process that may be performed by the system of FIG. 1.

FIG. 4 is a schematic representation showing an exemplary implementation of another process that may be performed by the system 100 of FIG. 1. In general, the process represented in FIG. 4 classifies or predicts (based on an aerial image that includes a building rooftop) various rooftop characteristics.

When the illustrated process begins, the system (at 432) has an aerial image that shows a building rooftop and some surrounding area. A visual boundary on the aerial image defines and outlines the building rooftop. In some implementations, this outline may have been applied previously to the image by the system 100. A visual inspection of the building rooftop reveals that the building rooftop has solar panels, there are no skylights and no apparent vegetation overhanging the building's rooftop, the building rooftop is a gable and shed style rooftop, and the rooftop is in fair condition. Moreover, the building rooftop is made of metal.

According to the illustrated implementation, the system 100 (at 433) crops the aerial image. In a typical implementation, the cropping removes some areas of the aerial image that are clearly outside the area of interest (i.e., the specific building rooftop). Next, according to the illustrated implementation, (again, at 433) the system 100 masks and resizes the image.

In some implementations, cropping could have been applied to the property regions as well. However, unlike properties, rooftops generally have a more consistent shape and size and therefore cropping is more likely to do a faithful job of normalizing their size and location within the image. In some implementations, therefore, cropping here enables the system to achieve higher accuracy compared to searching the entire parcel for an attribute that exists on the rooftop only.

Then (at 428), in the illustrated implementation, the resulting cropped, masked, and resized version of the image is applied to one or more segmentation DFCNs—including a skylights DFCN, a solar panels DFCN, and a vegetation overhang DFCN. In a typical implementation, the skylights DFCN is configured and trained to detect any skylights that might be present on the building rooftop defined by the visual boundary in the input image (at 432). In a typical implementation, the solar panels DFCN is configured and trained to detect any solar panels that might be present on the building rooftop defined by the visual boundary in the input image (at 432). In a typical implementation, the vegetation overhang DFCN is configured and trained to detect any vegetation that might be overhanging the building rooftop defined by the visual boundary in the input image.

The output image (437) produced by the segmentation DFCNs (at 428) identifies (e.g., with outlines added to a version of the input image) any rooftop structures (e.g., skylights, solar panels, or vegetation overhang) that the segmentation DFCNs predicted for the building rooftop in the image. Since the building rooftop in the illustrated example has solar panels, the system 100 has added visible outlines surrounding the solar panels in the output image (437). Since there are no skylights and no vegetation overhanging the building rooftop, the system 100 provides no indication that skylights or vegetation overhang are present in the output image (437). In some implementations, the system 100 may affirmatively express (e.g., in or in connection with the output image 437) that no skylights or vegetation overhang has been identified in the image.

In a typical implementation, the output image 437 (and associated information) may be provided to (e.g., sent to or made available at) any one or more (or all) of the system's computer-based user terminals 106, 108.

The system 100, according to the illustrated implementation, also feeds various information into a feature characteristic predictor 422, which includes image classifiers 435 and processing functionalities that facilitate predicting various characteristics of the building rooftop identified by the visual boundary in the original input image (432). More particularly, in the illustrated implementation, the annotated, outlined building rooftop from 432, the cropped, masked & resized image 433, and the output of the vegetation overhang segmentation DFCN (in 428) are all inputted to the image classifiers 435 of the feature characteristic predictor 422. The image classifiers 435 and the supportive processing functionalities in the feature characteristic predictor 422 use that input data to predict and calculate the extent of vegetation overhanging the building rooftop, the condition of the rooftop, a disrepair index for the building rooftop, a primary material of the rooftop, a secondary material of the rooftop, a primary roof type, and a secondary roof type. The supportive processing functionalities may be provided by one or more computer-based processors that are configured to apply decision-tree or selection-type logic to the data produced by the image classifiers 435.

The predicted rooftop characteristics produced by the feature characteristic predictor 422, in the illustrated implementation, include: vegetation overhang (none), roof condition (good), disrepair index (0, indicated that the rooftop is not in any notable disrepair), a primary roof material (shingle), a secondary roof material (metal), a primary roof type (gable), and a secondary roof type (none). These predicted rooftop characteristics 423 may be output by the system 100 by being made available at any one or more (or all) of the computer-based user interface devices 106, 108.

Figure 5:
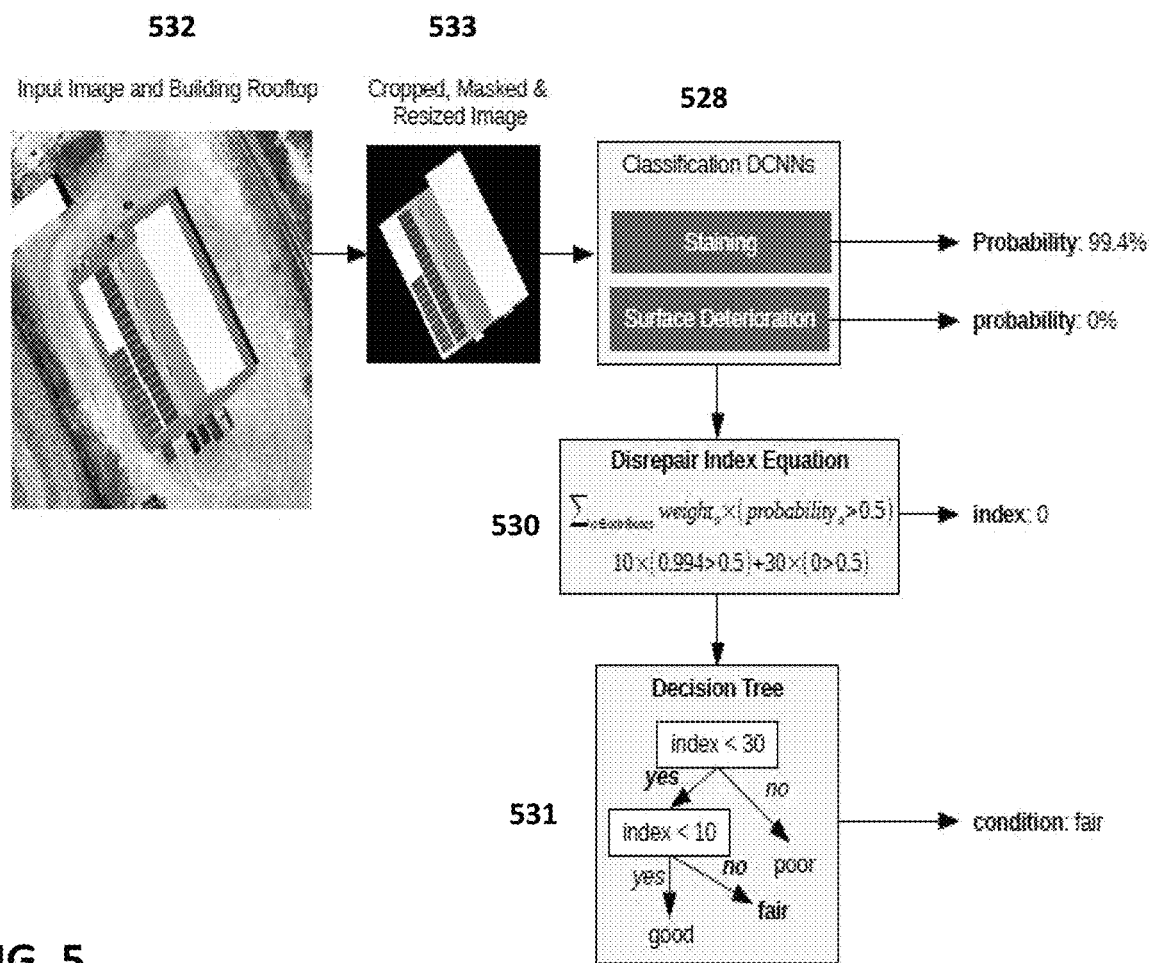
FIG. 5 is a schematic representation showing an exemplary implementation of yet another process that may be performed by the system of FIG. 1.

FIG. 5 is a schematic representation showing an exemplary implementation of another process that may be performed by the system 100 of FIG. 1. In general, the process represented in FIG. 5 calculates a disrepair index for a building rooftop and uses that disrepair index to predict the rooftop condition —all based on an aerial image that includes a building rooftop.

When the FIG. 5 process begins, the system (at 532) has an aerial image that shows a building rooftop and some surrounding area. A visual boundary on the aerial image defines and outlines the building rooftop. In some implementations, this outline may have been applied previously to the image by the system 100. The building rooftop is in fair condition.

According to the illustrated implementation, the system 100 (at 533) crops, masks, & resizes the aerial image.

Then (at 528), in the illustrated implementation, the resulting cropped, masked, and resized version of the image is applied to one or more classification DCNNs—including a building rooftop staining DCNN, and a building rooftop surface deterioration DCNN. In a typical implementation, the staining DCNN is configured and trained to detect any staining that might be present on the building rooftop defined by the visual boundary in the input image (at 532). More particularly, the staining DCNN in the illustrated implementation is configured to determine a probability that staining exists on the building rooftop. In a typical implementation, the surface deterioration DCNN is configured and trained to detect any surface deterioration on the building rooftop defined by the visual boundary in the input image (at 532). More particularly, the surface deterioration DCNN in the illustrated implementation is configured to determine a probability that surface deterioration exists on the building rooftop.

Next, according to the illustrated implementation, (at 530) the system 100 uses its processing resources to calculate a disrepair index using the following disrepair index equation:

$$\sum_{a \in attributes} weight_a \times (probability_a > 0.5)$$

where $weight_\alpha$ is a weight that gets applied to each respective attribute probability that influences the disrepair index, and probability, is the $probability_\alpha$ (as determined by the classification DCNNs 528) of each respective attribute abeing present in the image. In the illustrated example, the probability of staining being present (if over 50%) gets a weight of 10, and the probability of surface deterioration being present (if over 50%) gets a weight of 30. According to the equation, a particular probability only weighs in to the disrepair index equation if the probability is greater than 50%.

Next, according to the illustrated implementation, (at 531) the system utilizes its processing resources to apply decision tree logic to the calculated index equation. According to the illustrated exemplary decision tree logic: if the index is not less than 30, then the decision tree logic outputs a roof condition of "poor"; if the index is less than 30, but not less than 10, then the decision tree logic outputs a roof condition of "fair"; and if the index is less than 10, then the decision tree logic outputs a roof condition of "good." In a typical implementation, the decision tree logic may be implemented by software being performed on one or more processors.

In the illustrated example, the staining DCNN produces a probability of 99.4% that the building rooftop in the original input image has staining and the surface deterioration DCNN produces a probability of 0.0% that the building rooftop in the original input image has surface deterioration. Thus, the system 100 calculates a disrepair index for the rooftop of 10, and the decision tree logic outputs a condition of "fair" for the building rooftop.

In a typical implementation, one or more (or all) of the probabilities, the calculated disrepair index, and the condition may be sent to or made available for viewing at one or more (or all) of the computer-based user terminals 106, 108.

Figure 6:
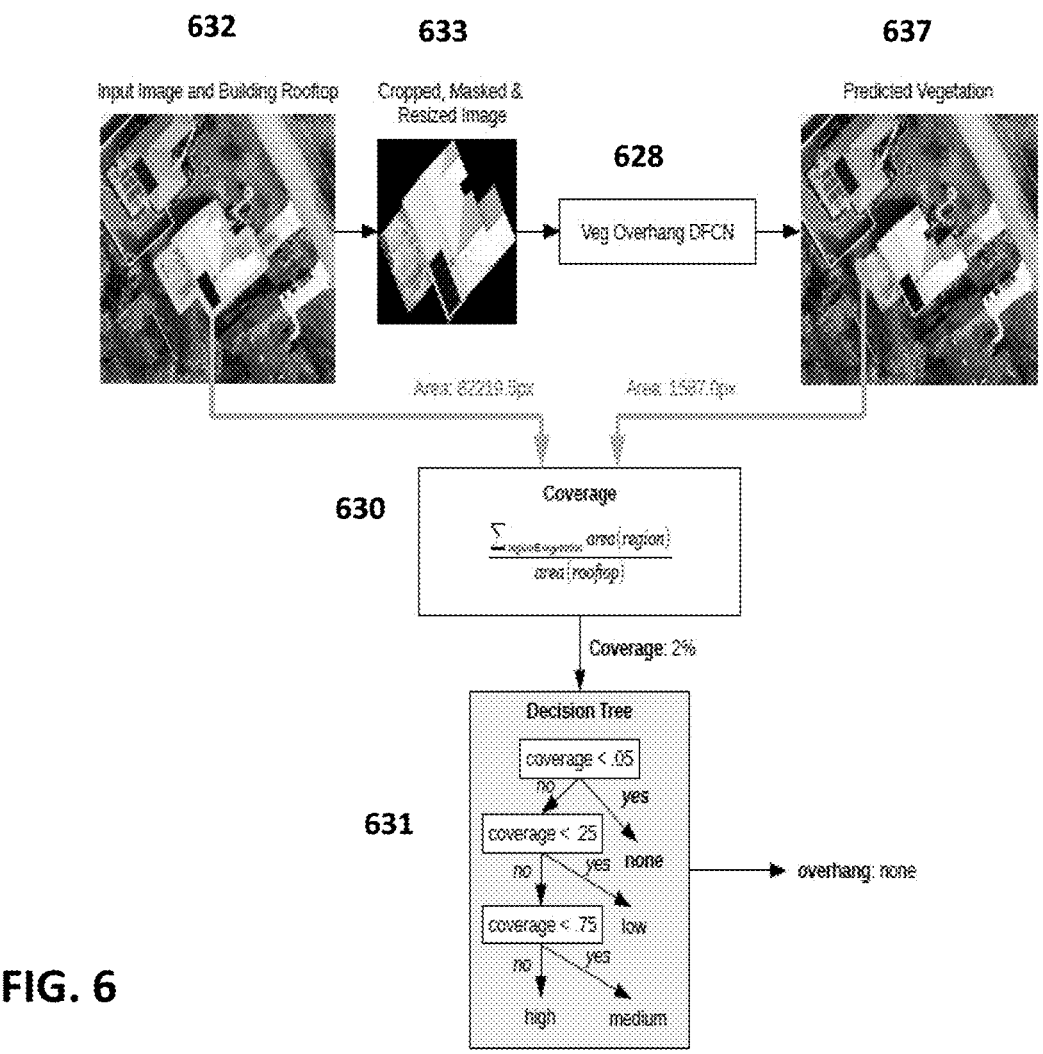
FIG. 6 is a schematic representation showing an exemplary implementation of still another process that may be performed by the system of FIG. 1.

FIG. 6 is a schematic representation showing an exemplary implementation of another process that may be performed by the system 100 of FIG. 1. In general, the process represented in FIG. 6 calculates a percentage of the rooftop that is covered by vegetation and uses that percent covered calculation to qualify the degree of coverage as "none", "low", "medium" or "high"—all based on an aerial image that includes the building rooftop.

When the FIG. 6 process begins, the system (at 632) has an aerial image that shows a building rooftop and some surrounding area. A visual boundary on the aerial image defines and outlines the building rooftop. In some implementations, this outline may have been applied previously to the image by the system 100. The building rooftop has very minimal vegetation coverage. The system 100, according to the illustrated implementation, determines, based on the input image, the area (e.g., in pixels) of the outlined building rooftop.

According to the illustrated implementation, the system 100 (at 633) crops, masks, & resizes the aerial image.

Then (at 628), the resulting cropped, masked, and resized version of the image is applied to a vegetation overhang DFCN. The vegetation overhang DFCN is configured to produce a modified version (at 637) of the original input image that outlines and identifies the area of the roof (e.g., in pixels) that the DFCN predicted to be covered by vegetation. In the illustrated example, the vegetation overhang DFCN also provides a numeric value representing the percent overhang.

Next (at 630), the system 100 uses its processing resources to calculate a percentage of the building rooftop that is covered by vegetation. The system does this based on the area calculations for the whole roof and the portion of the roof covered by vegetation. According to the illustrated implementation, the equation used in this regard is:

$$\frac{\sum_{region \in vegetation} area(region)}{area(rooftop)}$$

Next (at 631), the system 100 uses its processing resources to apply decision tree logic to the calculated percent coverage. According to the illustrated exemplary decision tree logic: if the percent coverage is less than 5%, then the decision tree logic outputs an overhang extent of "none"; if the percent coverage is not less than 5% but is less than 25%, then the decision tree logic outputs an overhang extent of "low"; if the percent coverage is not less than 25% but is less than 75%, then the decision tree logic outputs an overhang extent of "medium"; and if the percent coverage is not less than 75%, then the decision tree logic outputs an overhang extent of "high." In a typical implementation, the decision tree logic may be implemented by software being performed on one or more processors.

In the illustrated example, the area of the building rooftop that the system 100 calculates from the original input image is 82219.5 px, and the area of the rooftop that the system 100 predicts is covered by vegetation is 1587.0 px. The percent coverage that the system 100 calculates is 2% and, the overhang extent that is output by the decision tree logic is "none."

In a typical implementation, one or more (or all) of the calculated areas, the calculated percent coverage, and the overhang extent may be sent to or made available for viewing at one or more (or all) of the computer-based user terminals 106, 108.

Figure 7:
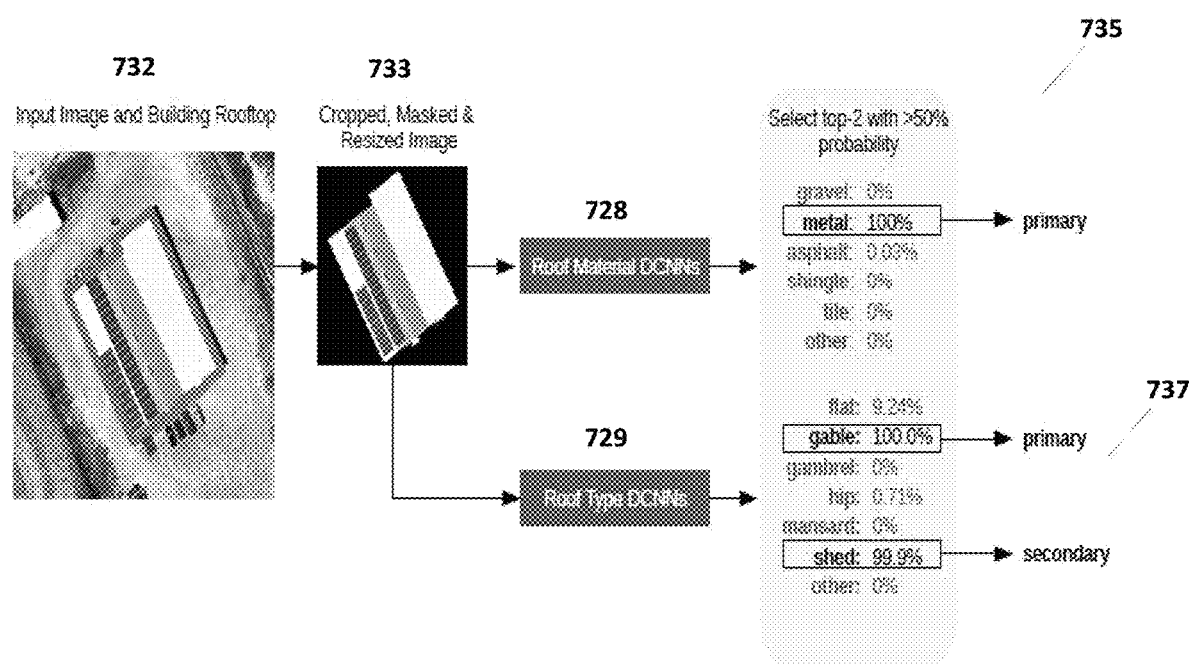
FIG. 7 is a schematic representation showing an exemplary implementation of yet another process that may be performed by the system of FIG. 1.

FIG. 7 is a schematic representation showing an exemplary implementation of yet another process that may be performed by the system 100 of FIG. 1. In general, the process represented in FIG. 7 uses roof material DCNNs 728 to determine the probability of different types of roof materials being present in an image of a building rooftop, uses roof type DCNNs 729 to determine a probability of different roof types being present in an image of a building rooftop, and selects the highest one or two materials and types having the highest probabilities.

When the FIG. 7 process begins, the system (at 732) has an aerial image that shows a building rooftop and some surrounding area. A visual boundary on the aerial image defines and outlines the building rooftop. In some implementations, this outline may have been applied previously to the image by the system 100. The building rooftop is a gable and shed style rooftop and is made of metal.

According to the illustrated implementation, the system 100 (at 733) crops, masks, & resizes the aerial image.

Then (at 728), the resulting cropped, masked, and resized version of the image is applied to roof material DCNNs. Each respective one of the roof material DCNNs, in the illustrated implementation, is configured to determine the probability that the building rooftop in the input image is gravel, metal, asphalt, shingle, tile, or other. The system (at 735) uses its processing functionalities to select the top (one or two) materials having the highest probabilities, greater than 50%.

The cropped, masked, and resized version of the image also is applied (at 729) to the roof type DCNNs. In the illustrated implementation, each respective roof type DCNN 729 is configured to determine the probability that the building type is flat, gable, gambrel, hip, mansard, shed, or other. The system (at 737) uses its processing functionalities to select the top (one or two) types having the highest probabilities, greater than 50%.

In the illustrated example, the roof material DCNNs determine that there is a 0% probability that the building rooftop in the original input image has gravel, a 100% probability that the building rooftop in the original input image has metal, a 0.03% probability that the building rooftop in the original input image has asphalt, a 0% probability that the building rooftop in the original input image has shingle, a 0% probability that the building rooftop has tile, and a 0% probability that the building rooftop in the original input image has some other material.

The system's processing resources, in the illustrated example, identify metal (at a probability of 100%) as the primary roof material. The system's processing resources, in the illustrated example, do not identify any other roof materials since the roof material DCNNs did not assign a probability higher than 50% to any of the other possibilities.

Moreover, in the illustrated example, the roof type DCNNs determine that there is a 9.24% probability that the building rooftop type is flat, a 100.0% probability that the building rooftop type is gable, a 0% probability that the building rooftop type is gambrel, a 0.71% probability that the building rooftop type is hip, a 0% probability that the building rooftop type is mansard, a 99.9% probability that the building rooftop type is shed, and a 0% probability that the building rooftop type is some other type.

The system's processing resources, in the illustrated example, identify gable (at a probability of 100.0%) as the primary roof type and shed (at a probability of 99.9%) as the secondary roof type.

In a typical implementation, one or more (or all) of the calculated roof material, probabilities, calculated roof type probabilities, primary and secondary roof materials and primary and secondary roof types may be sent to or made available for viewing at one or more (or all) of the computer-based user terminals 106, 108.

In a typical implementation, each DFCN in the system is configured, and specifically trained, to detect one specific attribute.

Figure 8:
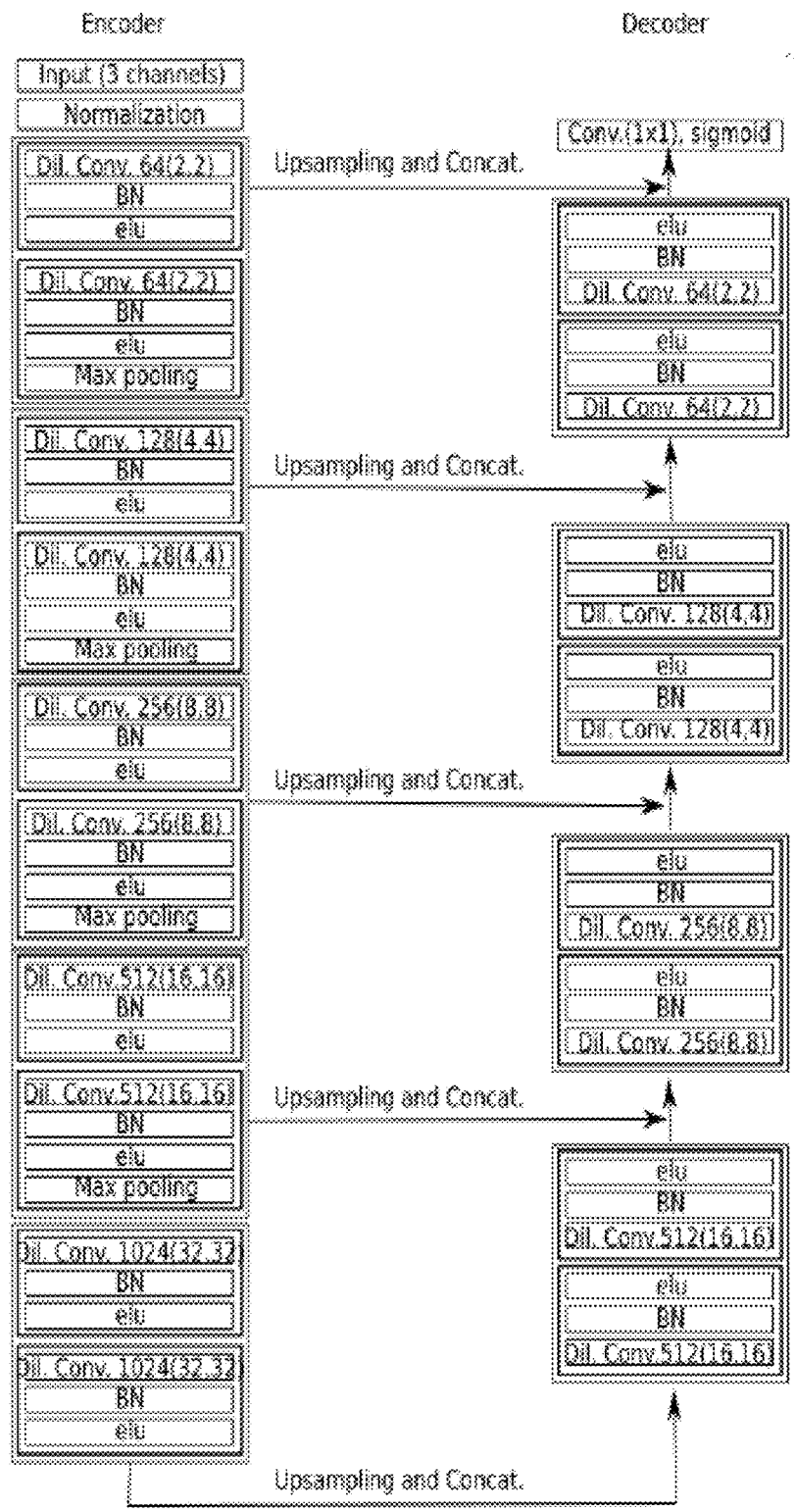
FIG. 8 is a schematic representation of an exemplary building rooftop deep fully convolutional network configured and trained (or trainable) to detect building rooftops in an aerial image.

As an example, FIG. 8 is a schematic representation of an exemplary building rooftop DFCN 818 (i.e., a segmentation network specially configured and trained, or trainable, to detect building rooftops in aerial images).

The illustrated building rooftop DFCN 818 consists of an encoder, a decoder, and a plurality of skip connections that extend from various points in the encoder to the decoder.

At a high level, the encoder takes an input (e.g., an aerial image) and creates a vector that represents features (e.g., building rooftops) that are in the image. The decoder takes the feature vector from the encoder, and matches the features, as closely as possible, to the original input image. More particularly, the encoder selects or identifies features (e.g., rooftop edges, etc.) in the image that may be salient to the task at hand (i.e., identifying any building rooftops in the image), whereas the decoder predicts (based on the identified features), for every pixel in the image, whether that pixel shows the feature of interest (i.e., a building rooftop) or not. The output from the decoder is typically the same size as the input image, which makes mapping of the output from the decoder to the original image quite simple.

The encoder in the illustrated implementation has an input, a normalization layer, and multiple processing segments.

The input of the encoder is configured to receive an image and, optionally, other data (e.g., data identifying or outlining a region of interest, such as a property or a building rooftop, in the image). The input in the illustrated implementation is a three-channel input and, therefore, is configured and suitable to receive a three-channel color image (e.g., a red-green-blue or "RGB" image).

The normalization layer is configured to receive the input image and scale (or normalize) its pixel intensity values to be between −1 and 1. The purpose of normalization is to enable a more stable and efficient training of the building rooftop DFCN 818. It guarantees that each feature will have a similar range of pixel values so that gradients do not become too large during training and in general leads to faster convergence. It also enables the use of one global learning rate multiplier in the network where training consists of multiplying weights and adding biases in order to cause activations and back-propagate gradients.

The encoder in the illustrated implementation has ten processing segments. The first processing segment, for example, looks at local features (e.g., edges, etc.) in the image and each subsequent processing segment looks at more and more image data, focusing on progressively more global features (e.g., portions of building rooftops and/or full building rooftops) in the image.

The decoder has multiple processing segments and an output.

The illustrated decoder has eight processing segments.
The output of the decoder has convolution and a sigmoid.

Every processing segment in the encoder and decoder has a dilated convolution layer, a batch normalization layer, and an exponential linear unit (elu) layer.

In a typical implementation, the dilated convolutional layers form deep, feed-forward artificial neural network-based layers for analyzing visual imagery. Each layer's parameters may consist of a set of learnable filters (or kernels) with small receptive fields. During a forward pass, for example, each filter is convolved across the input image, computing a dot product, for example, of the entries in the filter and the input image to produce a 2-dimensional activation map of that filter. As a result, the network learns filters that activate when detecting some specific type of feature at some spatial location in the input image. Stacking the activation maps for all filters along the depth dimension may form the full output of a convolution layer.

In some implementations, each dilated convolutional layer may be defined, at least in part, by a kernel size (that defines the field of view of the convolution), a stride (that defines the step size of the kernel when traversing an image), and a dilation rate (that defines a spacing between the values in a kernel). A 3×3 kernel with a dilation rate of 2, for example, will have the same field of view as a 5×5 kernel, while only using 9 parameters. Thus, the use of dilated convolutional layers in the illustrated building rooftop DFCN 818 advantageously covers wide fields of view in a cost-effective and efficient manner.

Each of the first two dilated convolution layers in the illustrated encoder is associated with a feature vector that represents 64 features using a 2×2 dilation kernel. Each of the next two dilated convolution layers in the illustrated encoder is associated with a feature vector that represents 128 features using a 4×4 dilation kernel. Each of the next two dilated convolution layers in the illustrated encoder is associated with a feature vector that represents 256 features using an 8×8 dilation kernel. Each of the next two dilated convolution layers in the illustrated encoder is associated with a feature vector that represents 512 features using a 16×16 dilation kernel. Each of the next two dilated convolution layers in the illustrated encoder is associated with a feature vector that represents 1024 features using a 32×32 dilation kernel. Each of the first two dilated convolution layers in the illustrated decoder is associated with a feature vector that represents 512 features using a 16×16 dilation kernel. Each of the next two dilated convolution layers in the illustrated decoder is associated with a feature vector that represents 256 features using an 8×8 dilation kernel. Each of the next two dilated convolution layers in the illustrated decoder is associated with a feature vector that represents 128 features using a 4×4 dilation kernel. The last two dilated convolution layers in the illustrated decoder are associated with a feature vector that represents 64 features using a 2×2 dilation kernel.

The batch normalization layer in each processing segment of the encoder and decoder performs batch normalization on the data that passes through it. Batch normalization refers generally to a process for improving the performance and stability of artificial neural networks, such as the building rooftop DFCN 818. It is a technique that may, in certain instances, provide any layer within a neural network with inputs that are zero mean/unit variance, and may normalize an input layer by adjusting and scaling activations.

The exponential linear units (elu) in the encoder and decoder of the building rooftop DFCN 818 are or apply activation functions that tend to push the mean of the activations in the building rooftop DFCN 818 closer to zero, which can result in faster learning and convergence.

Every other processing segment in the encoder (starting with the second processing segment), except the last processing segment in the encoder, has a max pooling layer. Pooling refers to a form of non-linear down-sampling. Max pooling typically partitions an input image into a set of non-overlapping rectangles and, for each such sub-region, outputs the maximum. The intuition is that the exact location of a feature is less important than its rough location relative to other features. The max pooling layers generally serve to progressively reduce the spatial size of a representation, to reduce the number of parameters and amount of computation in the network, and to control over-fitting.

The skip connections that extend from various points in the encoder to various points in the decoder pass data from the various points in the encoder to the various points in the decoder essentially skipping layers in the building rooftop DFCN 818 architecture. The first skip connection, for example, extends from a point in the encoder just before the first max pooling layer to an output of the final processing segment in the decoder. The second skip connection, for example, extends from a point in the encoder just before the second max pooling layer to a point in the decoder just before the last two processing segments in the decoder. The third skip connection, for example, extends from a point in the encoder just before the third max pooling layer to a point in the decoder just before the last four processing segments in the decoder. The fourth skip connection, for example, extends from a point in the encoder just before the last max pooling layer to a point in the decoder just after the first two processing segments in the decoder.

The advantage of passing data across the skip connections from the various points in the encoder to the various points in the decoder essentially skipping layers in the building rooftop DFCN 818 architecture is that the transferred data facilitates accurate functioning of the decoder to produce a representation of the identified attributes (e.g., building rooftops) that align accurately with the original input image. Bypassing the multiple processing segments and associated max pooling avoids any data degradation that might be introduced by those multiple processing segments and associated max pooling.

There is also a connection from the output of the encoder to the input of the decoder.

In the illustrated implementation, up-sampling and concatenation may be associated with each respective one of the skip connections and the connection from the output of the encoder to the input of the decoder.

The output layer of the decoder has a convolution component and a sigmoid.

The convolution component in the output layer of the decoder consists of an input layer, an output layer, as well as one or more hidden layers.

In an exemplary implementation, the building rooftop DFCN 818 applies a sigmoid to converts single number outputs per pixel from the last processing segment of the decoder to probability values.

Figure 9:
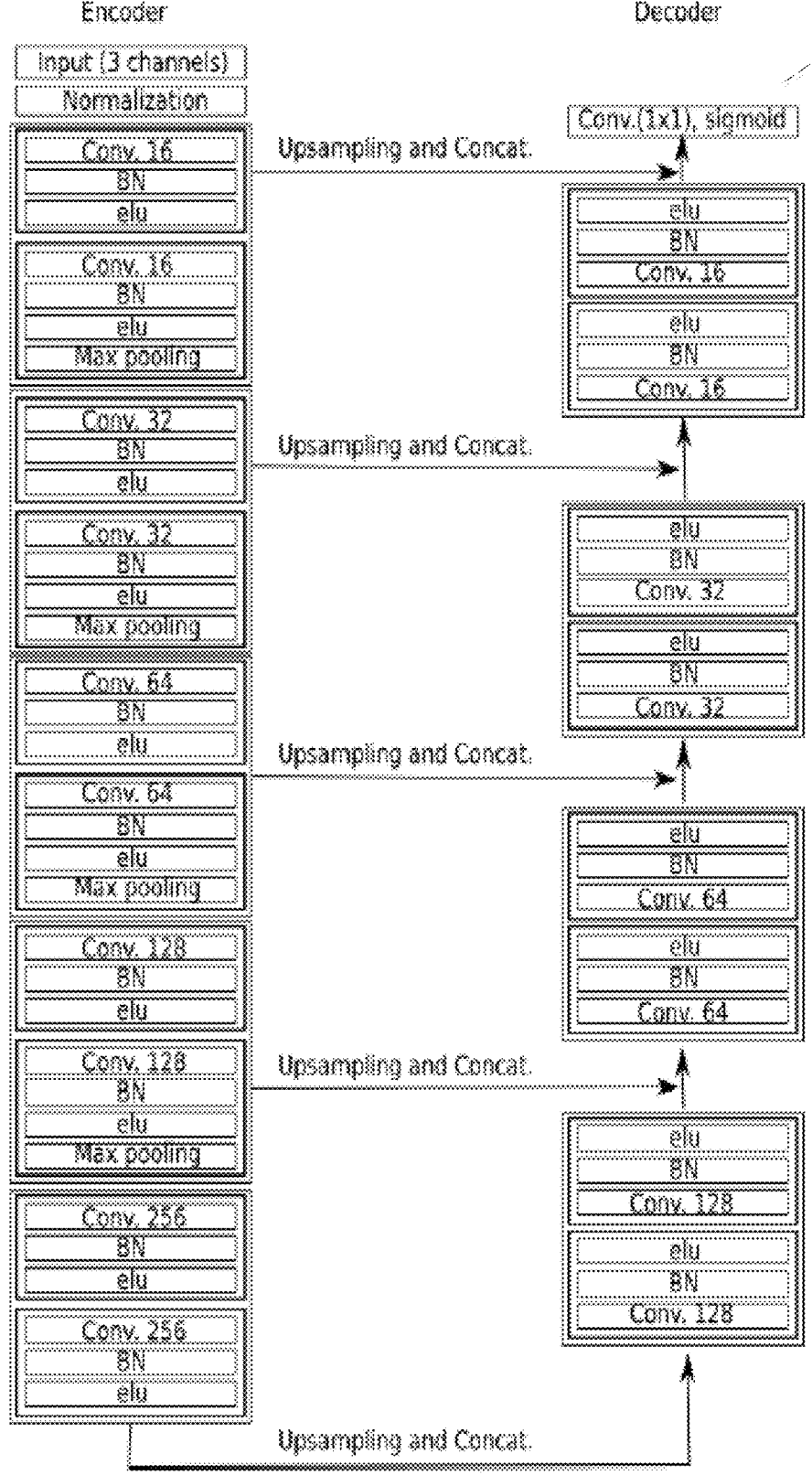
FIG. 9 is schematic representation of an exemplary deep fully convolutional network configured and trained (or trainable) to detect either above ground pools, in ground pools, or trampolines in an aerial image.

FIG. 9 is a schematic representation of another example of a DFCN 918 that is configured, and can be specifically trained, to detect one specific attribute (e.g., either an above ground pool (with one training), an in ground pool (with a different training), or a trampoline (with yet another different training) in an aerial image).

The DCNN 918 in FIG. 9 is similar in some ways to the building rooftop DFCN 818 in FIG. 8. However, there are some notable differences.

For example, the processing segments in the DFCN 918 have convolution layers, instead of dilated convolution layers.

Each of the first two convolution layers in the illustrated encoder is associated with a feature vector that represents 16 features. Each of the next two convolution layers in the illustrated encoder is associated with a feature vector that represents 32 features. Each of the next two convolution layers in the illustrated encoder is associated with a feature vector that represents 64 features. Each of the next two convolution layers in the illustrated encoder is associated with a feature vector that represents 128 features. Each of the next two convolution layers in the illustrated encoder is associated with a feature vector that represents 256 features.

Each of the first two convolution layers in the illustrated decoder is associated with a feature vector that represents 128 features. Each of the next two convolution layers in the illustrated decoder is associated with a feature vector that represents 64 features. Each of the next two convolution layers in the illustrated decoder is associated with a feature vector that represents 32 features. The last two convolution layers in the illustrated decoder are associated with a feature vector that represents 16 features.

Figure 10:
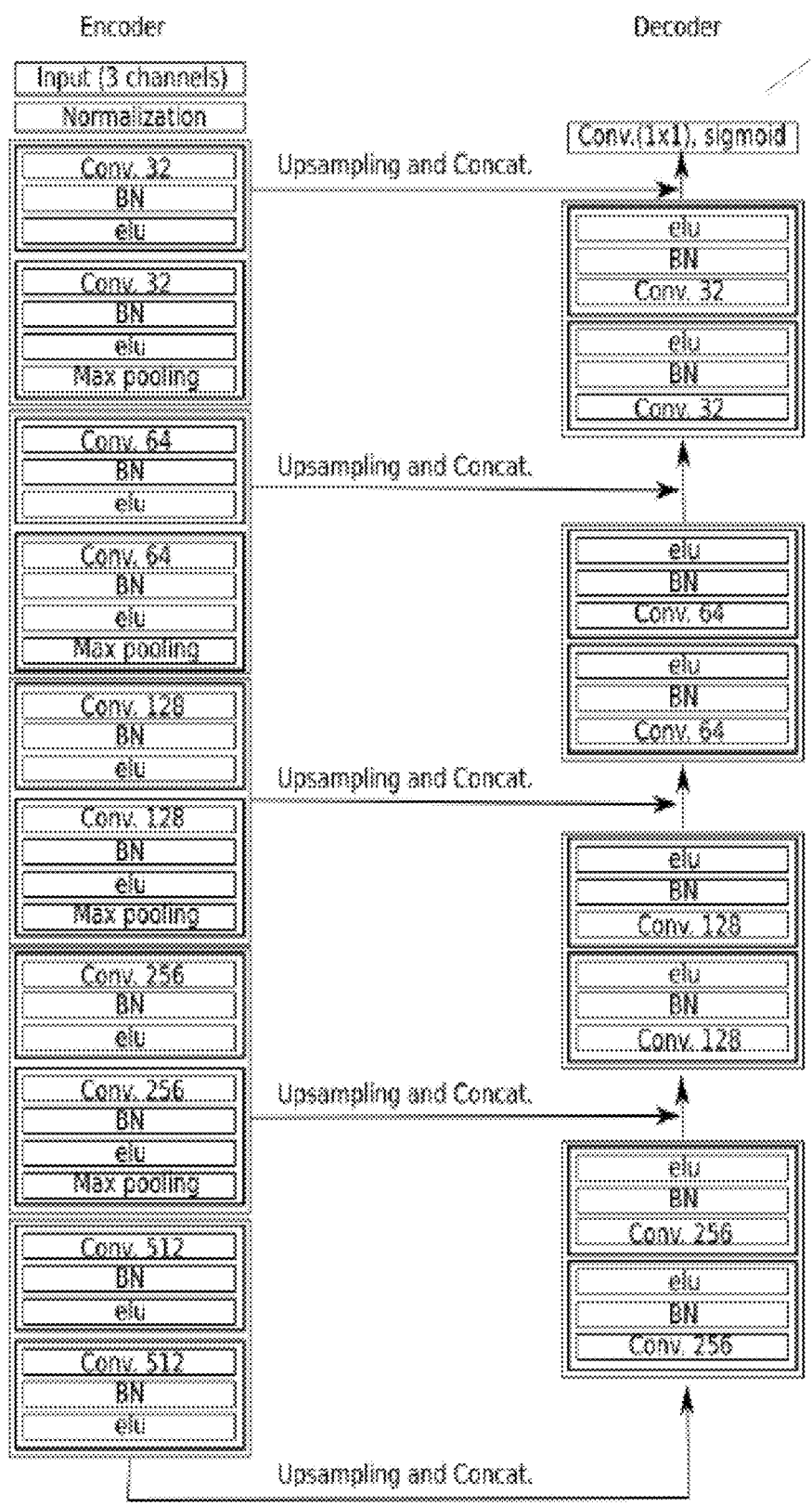
FIG. 10 is schematic representation of another exemplary deep fully convolutional network that is configured and trained (or trainable) to detect either solar panels, skylights, or vegetation overhang in an aerial image.

FIG. 10 is a schematic representation of another example of a DFCN 1018 that is configured, and can be specifically trained, to detect one specific attribute (e.g., either solar panels (with one training), skylights (with a different training), or vegetation overhang (with yet another different training) in an aerial image).

The DFCN 1018 in FIG. 10 is similar in some ways to the DFCN 918 in FIG. 9, except that each sequential convolution layer in the DFCN 1018 in FIG. 10 is associated with a feature vector that represents a different number of features than the corresponding convolution layer in the DFCN 918 in FIG. 9.

In the DFCN 1018 in FIG. 10, each of the first two convolution layers in the illustrated encoder is associated with a feature vector that represents 32 features. Each of the next two convolution layers in the illustrated encoder is associated with a feature vector that represents 62 features. Each of the next two convolution layers in the illustrated encoder is associated with a feature vector that represents 128 features. Each of the next two convolution layers in the illustrated encoder is associated with a feature vector that represents 256 features. Each of the next two convolution layers in the illustrated encoder is associated with a feature vector that represents 512 features.

Moreover, in the DFCN 1018 in FIG. 10, each of the first two convolution layers in the illustrated decoder is associated with a feature vector that represents 256 features. Each of the next two convolution layers in the illustrated decoder is associated with a feature vector that represents 128 features. Each of the next two convolution layers in the illustrated decoder is associated with a feature vector that represents 64 features. The last two convolution layers in the illustrated decoder are associated with a feature vector that represents 32 features.

In some implementations, the system 100 of FIG. 1 includes the specific combination of: 1) one version of the DFCN 818 in FIG. 8, specifically trained to identify building rooftops in an aerial image, 2) three of the DFCNs 918 in FIG. 9, respectively trained to detect above ground pools, in-ground pools, and trampolines in an aerial image, and 3) three of the DFCNs 1018 in FIG. 10, respectively trained to detect solar panels, skylights, and vegetation overhang in an aerial image. Moreover, in some implementations, there are no other DFCNs in the system 100.

There are a variety of ways that the system 100, and its various ConvNets 118, can be trained to perform in the manner described herein. In essence, however, each ConvNet is trained, prior to being deployed for detection or prediction of attributes, to detect or predict one very particular type of attribute (e.g., either building rooftops, above ground pools, in ground pools, trampolines, skylights, solar panels, vegetation overhang, roof staining, roof surface deterioration, roof material, or roof type).

Figure 11:
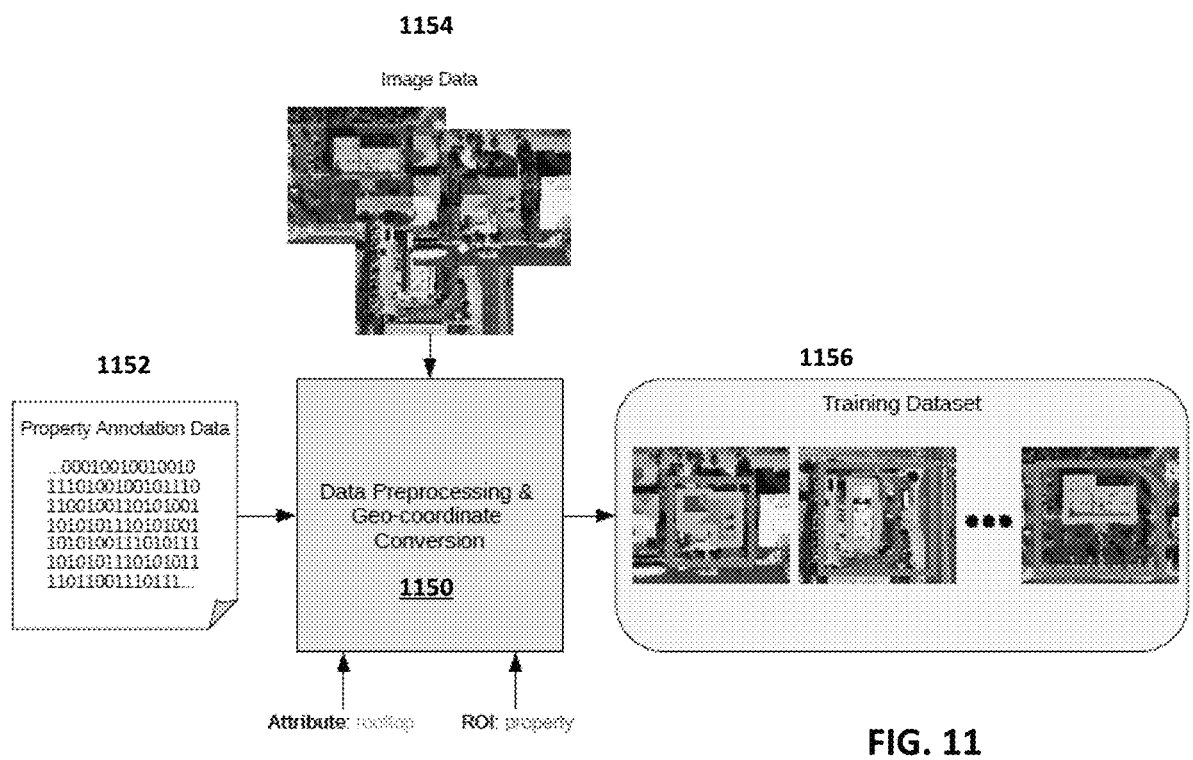
FIGS. 11 and 12 are schematic representations showing exemplary processes that may be involved in the training of a building rooftop deep fully convolutional network.
Figure 12:
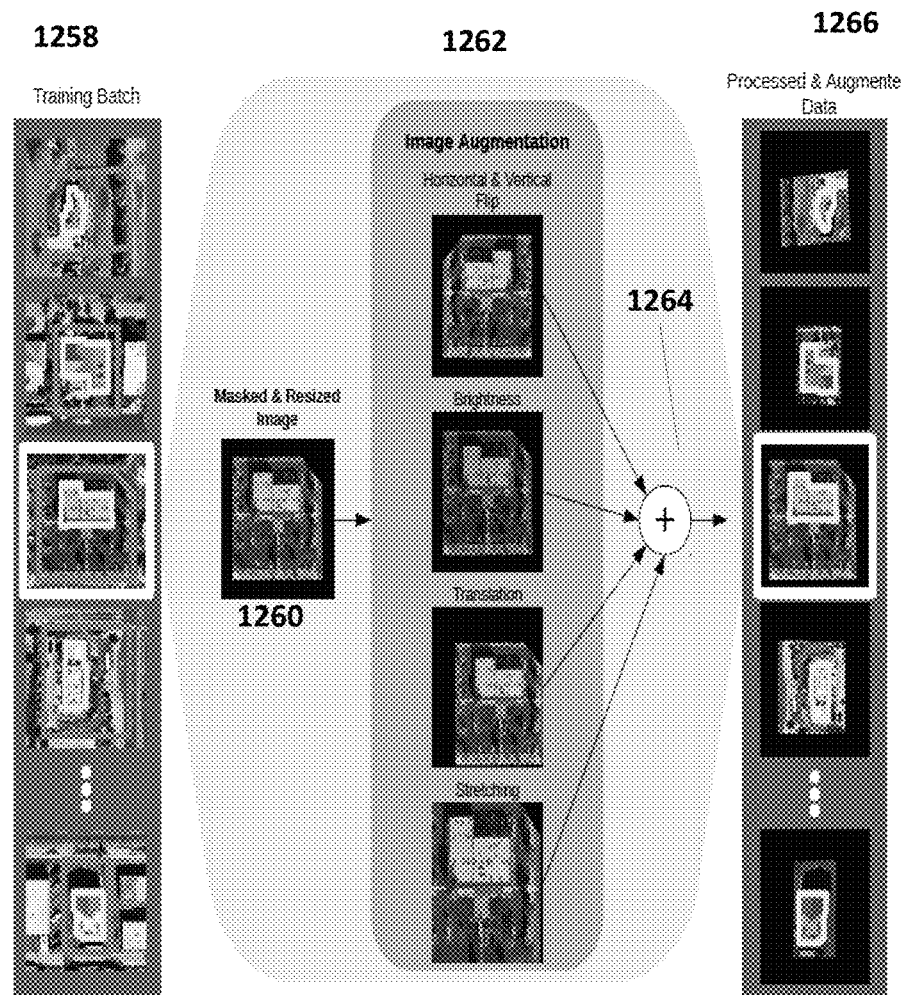

FIGS. 11 and 12 are schematic representations showing exemplary processes that may be involved in the training of a building rooftop DFCN.

FIG. 11, for example, shows a data pre-processing and geo-coordinate conversion module 1150 (which may be implemented, for example, in software executing on a physical computer-based processor). The system 100 feeds property annotation data 1152 (e.g., from human annotators) and corresponding image data 1154 (e.g., captured by a plane flying overhead) into the data pre-processing and geo-coordinate conversion module 1150. The data pre-processing and geo-coordinate conversion module 1150 converts the property annotation data 1152 and corresponding image data 1154 into a training dataset 1156 for the building rooftop DFCN. Geo-coordinate conversion uses the image corner geo-coordinates and the distance of the camera to the earth to convert the property and rooftop boundary coordinates from latitude and longitude to pixel coordinates in the image. Data preprocessing filters the data to keep only those images that have valid property and rooftop boundary coordinates after geo-coordinate conversion to ensure that their coordinates lie within the bounds of the image. The training dataset includes a plurality of discrete images, each of which is an aerial view that includes at least one property and one building rooftop that are outlined and, thereby, identified as a property and a building rooftop. In a typical implementation, the system 100 saves training datasets produced in this manner for use in training the ConvNets 118.

FIG. 12 represents an exemplary process by which the system 100 may utilize data from a training dataset (training batch 1258) to train a ConvNet in a highly effective manner.

The first column represents a batch 1258 of training images that the system 100 may have stored in computer-based memory (e.g., 114 in FIG. 1). Each image in the training batch 1258 is an aerial view of a physical area and includes one visible outline that defines a property line in the image, and a second visible outline that defines a building rooftop in the image.

The system 100 (at 1260) takes each image and masks and resizes the image. Next, the system 100 (at 1262) performs various kinds of augmentations on the masked and resized image. These augmentations can include virtually any kind of augmentations. In the illustrated example, however, the augmentations include horizontal and vertical flipping of the image, brightness adjustment to the image, translation of the image, and stretching of the image. This augmentation step produces various, different (augmented) versions of the same image. The system 100 (at 1264) utilizes all of these different (augmented) versions of the same image to train the building rooftop DFCN—this results in a processed and augmented dataset (at 1266).

It is possible that, in some implementations, instead of one or more (or all) of the ConvNets described above, the system 100 may include a different kind of network, appropriately trained to detect or predict a corresponding one of the attributes referred to herein.

Figure 13:
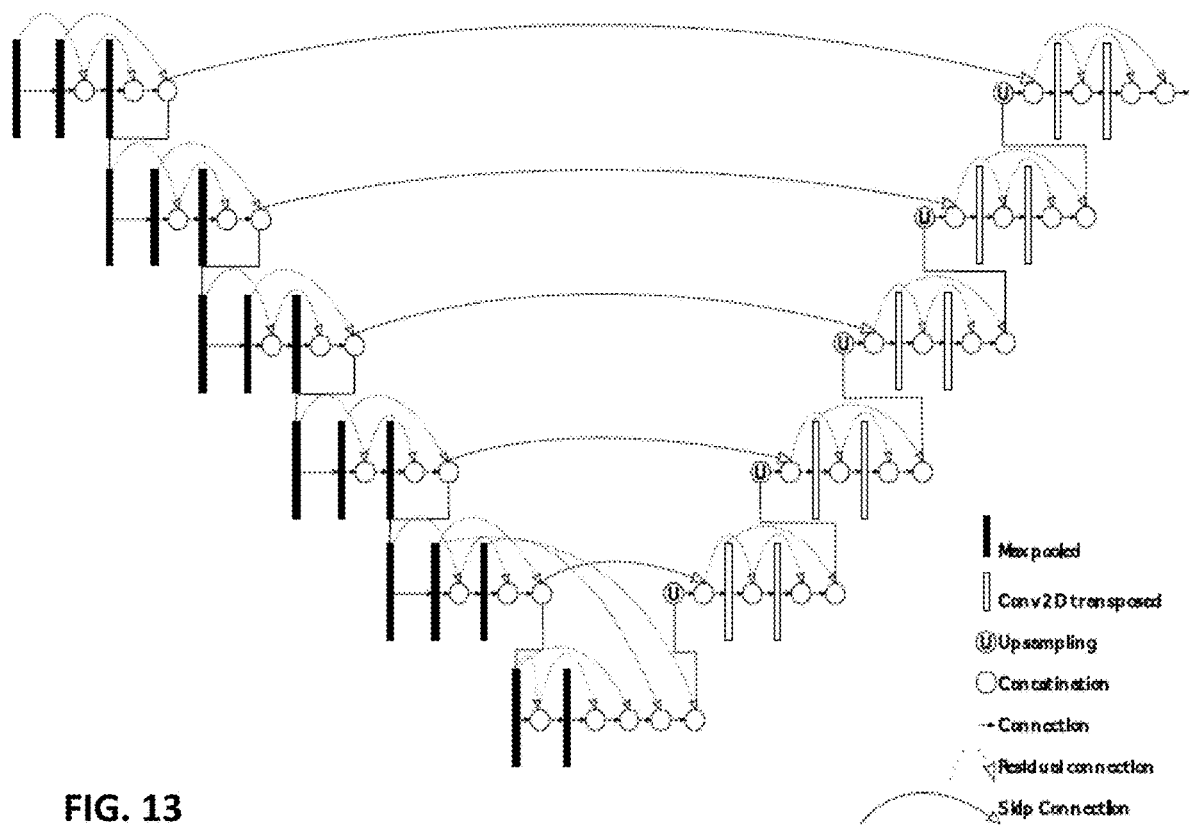
FIG. 13 is a schematic representation of an autoencoder fully convolutional network (FCN) with residual connections and skip connections between the encoder (left side) and the decoder (right side).

FIG. 13, in particular, shows one example of an alternative kind of network that may be utilized in this regard.

The network in FIG. 13 is an autoencoder deep fully convolutional network 1318 with residual connections and skip connections between the encoder (left side) and the decoder (right side). The connections allow the gradients to flow through the network without passing through the activation.

The network 1318 consists of 10 layers. The first 4 layers have two 2×2 dilated convolutions each, three concatenations used between the connections, and residual connections. The transition between each of the layers consists of regularization in the form of batch normalization (BN), exponential linear unit (elu), 1×1 convolution, a regularization in the form of drop out, and 2×2 maxpooling.

The fifth layer consists of two 2×2 convolutions and 5 concatenations with intra and inter residual connections with the last layer in the encoder.

The decoder layers consist of two 2×2 convolutions and four concatenation steps and one inverse convolution (upsampling).

In a typical implementation, the number of channels in each layer is determined empirically for each of the trained features. This may be done to help achieve a balance between the noise caused by the extraneous information and the problem of diminishing feature reuse.

Another example of an alternative network is the Mask Region-based Convolutional Neural Network (K. He, G. Gkioxari, P. Dollar and R. Girshick, Mask R-CNN.). It combines both bounding box prediction and object segmentation into a single model and can be used to predict the property and rooftop attributes described herein jointly as well as individually.

A number of embodiments of the invention have been described. Nevertheless, it will be understood that various modifications may be made without departing from the spirit and scope of the invention.

For example, the systems and techniques can be utilized in connection with any one of a variety of different applications. For example, in some implementations, the systems and techniques disclosed herein can be used to provide raw data (e.g., probabilities, classifications, etc.) directly to an end user for whatever use the end user might have. In some implementations, the systems and techniques may be used in connection with (and part of a checking system for) human annotators, who are annotating the aerial images according to what they see in the images with their eyes. In those implementations, the system may include processing functionalities that compare annotations made by the human annotators to annotations, classifications, etc. made by the system. If an error or an oversight is identified, the system may take steps to ensure that the human annotations are at least flagged for follow-up consideration. In those instances, the final annotated images are annotated by human annotators, and the systems and techniques described herein help reduce the amount of human supervision over those human annotators that might otherwise be required to minimize or eliminate errors or oversights.

In some implementations, any attributes that the system identifies or predicts as being present in each respective image are saved in a database (e.g., in memory 114). Likewise, any annotations made by a human annotator (e.g., at one of the computer-based user interface devices 108) may be saved in the same or a different database. The system (e.g., using processor 112) compares the attributes that the system identifies or predicts to the annotations made by a human annotator. If the system determines that the attributes identified or predicted by the system match or correspond to the human annotations for a particular image (e.g., both the system and the human identified the same attributes—the presence or absence of a building rooftop, the presence or absence of an above ground or in ground pool, a trampoline, skylights, solar panels, vegetation overhang, staining, and/or surface deterioration, or characteristics thereof), the system can be thought to have verified the human annotations. In such instances, the system may leave the human annotated version of the image intact in its database and (optionally) tag the annotated image as having been verified. If the system determines that the attributes identified or predicted by the system do not correspond to the human annotations for a particular image (e.g., the system and the human did not identify the same attributes—the presence or absence of a building rooftop, the presence or absence of an above ground or in ground pool, a trampoline, skylights, solar panels, vegetation overhang, staining, and/or surface deterioration, or characteristics thereof) the system may flag the image for further consideration without verifying the image, and/or send the image back for reconsideration to the original human annotator (e.g., with a note to consider the noted differences), and/or send the image (original version or annotated version) to a different human annotator than the first human annotator (with or without a note to consider any noted differences between the original human annotations and the system predictions).

In some implementations, the system may include other ConvNets trained to detect or predict attributes other than those specifically mentioned herein. In some implementations, the system may include fewer ConvNets than described herein. Likewise, in some implementations, the system may include other image classifiers configured to classify an image according to some other criteria not specifically mentioned herein. And, in some implementations, the system may include fewer image classifiers than described herein.

In some implementations, some of the equations disclosed herein may vary. For example, the weights (of 10 and 30, respectively) applied to the staining and surface deterioration probabilities in the disrepair index equation may vary considerably. However, for a given system, whatever these weights are, they should generally be applied consistently across all images. Likewise, in some implementations, the decision tree logic applied to assess roof condition, and extent of rooftop vegetation overhang, for example, can vary considerably, with different logic paths, different possible outcomes, and decision points being at different values than those specifically described herein. Likewise, the selection logic can be varied, too, selecting and ordering any number of possible outcomes, for example.

In some implementations, other imaging devices including satellites and ground vehicles can be used in place of or in addition to aerial cameras to collect imagery of each property. This can be used to extend coverage to properties for which aerial imagery is not yet available and/or to provide images from different viewing angles (e.g., side views) to improve the prediction of existing aerial property attributes and/or facilitate the prediction of news ones such as building material and number of stories or windows.

The ConvNets can be implemented, for example, as part of or in a graphics processing unit (GPU), a CPU, or other processing device(s). Any processors, or other devices configured to provide processing resources referred to or alluded to herein, may be implemented with one or more (local or distributed) computer-based processors. Likewise, any computer-based memory may be implemented with one or more (local or distributed) memory storage devices.

The system can include any number of one or more computer-based user access terminals.

In various embodiments, certain aspects of the subject matter disclosed herein can be implemented in digital electronic circuitry, or in computer-based software, firmware, or hardware, including the structures disclosed in this specification and/or their structural equivalents, and/or in combinations thereof. In some embodiments, the subject matter disclosed herein can be implemented in one or more computer programs, that is, one or more modules of computer program instructions, encoded on computer storage medium for execution by, or to control the operation of, one or more data processing apparatuses (e.g., processors). Alternatively, or additionally, the program instructions can be encoded on an artificially generated propagated signal, for example, a machine-generated electrical, optical, or electromagnetic signal that is generated to encode information for transmission to suitable receiver apparatus for execution by a data processing apparatus. A computer storage medium can be, or can be included within, a computer-readable storage device, a computer-readable storage substrate, a random or serial access memory array or device, or a combination thereof. While a computer storage medium should not be considered to include a propagated signal, a computer storage medium may be a source or destination of computer program instructions encoded in an artificially generated propagated signal. The computer storage medium can also be, or be included in, one or more separate physical components or media, for example, multiple CDs, computer disks, and/or other storage devices.

The operations described in this specification can be implemented as operations performed by a data processing apparatus (e.g., a processor) on data stored on one or more computer-readable storage devices or received from other sources. The term "processor" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. For example, many databases are described—these can be implemented as one single database (or collection of information) or many. As used herein, database can mean one or more databases.

Similarly, while operations are disclosed herein as occurring in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Furthermore, some of the concepts disclosed herein can take the form of a computer program product(s) accessible from a computer-usable or may be incorporated into a computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

Other implementations are within the scope of the claims.

What is claimed is:

1. A computer-based method comprising:
   receiving, at a computer-based system, an aerial image of a property that includes a first visual indicator on the aerial image that follows and identifies a boundary line for the property;
   using a building rooftop deep fully convolutional network, configured and trained to predict the presence of building rooftops in aerial imagery, to predict whether any building rooftops are present within the boundary line of the property based on the aerial image;
   applying a second visual indicator to the aerial image to identify and outline a building rooftop in the aerial image identified by the building rooftop deep fully convolutional network; and
   using an additional deep fully convolutional network, configured and trained to predict the presence of an additional property feature in aerial imagery, to predict whether said additional property feature is present with the boundary line of the property based on the aerial image,
   wherein the building rooftop and additional deep convolutional networks have identical configurations but use different weights.

2. The computer-based method of claim 1, further comprising:
   using a skylights deep fully convolutional network, configured and trained to predict the presence of skylights on building rooftops in aerial imagery, to predict whether any skylights are present on the building rooftop that was identified by the second visual indicator;
   using a solar panels deep fully convolutional network, configured and trained to predict the presence of solar panels on building rooftops in aerial imagery, to predict whether any solar panels are present on the building rooftop that was identified by the second visual indicator; and/or
   using a vegetation overhang deep fully convolutional network, configured and trained to predict the presence of vegetation overhanging building rooftops in aerial imagery, to predict whether any vegetation is overhanging the building rooftop that was identified by the second visual indicator.

3. The computer-based method of claim 2, further comprising:
   applying a third visual indicator to the aerial image to identify and outline skylight(s) identified by the skylights deep fully convolutional network on the building rooftop;
   applying a fourth visual indicator to the aerial image to identify and outline solar panel(s) identified by the solar panels deep fully convolutional network on the building rooftop; and/or
   applying a fifth visual indicator to the aerial image to identify and outline vegetation overhang identified by the vegetation overhang deep fully convolutional network on the building rooftop.

4. The computer-based method of claim 3, wherein the skylights deep fully convolutional network, the solar panels deep fully convolutional network, and the vegetation overhang deep fully convolutional network have identical configurations but use different weights.

5. The computer-based method of claim 4, further comprising:
   providing each of the skylights deep fully convolutional network, solar panels deep fully convolutional network, and vegetation overhang deep fully convolutional network,
   wherein each of the skylights deep fully convolutional network, solar panels deep fully convolutional network, and vegetation overhang deep fully convolutional network comprises:
   an encoder,
   a decoder, and
   a plurality of skip connections that extend from various points in the encoder to the decoder,
   wherein the encoder comprises:
   an input,
   a normalization layer, and
   ten processing segments; and
   wherein the decoder comprises:
   eight processing segments; and
   an output,
   wherein every processing segment in the encoder and decoder comprises:
   a convolution layer,
   a batch normalization layer; and
   an exponential linear unit (elu) layer, and
   wherein every other processing segment in the encoder, starting with a second processing segment in the encoder, has a max pooling layer.

6. The computer-based method of claim 5, wherein:
   each of the first two convolution layers in the encoder is associated with a feature vector that represents 32 features,
   each of the next two convolution layers in the encoder is associated with a feature vector that represents 64 features,
   each of the next two convolution layers in the encoder is associated with a feature vector that represents 128 features,
   each of the next two convolution layers in the encoder is associated with a feature vector that represents 256 features, each of the next two convolution layers in the encoder is associated with a feature vector that represents 512 features, and wherein:

each of the first two convolution layers in the decoder is associated with a feature vector that represents 256 features, each of the next two convolution layers in the decoder is associated with a feature vector that represents 128 features, each of the next two convolution layers in the decoder is associated with a feature vector that represents 64 features, and the last two dilated convolution layers in the decoder are associated with a feature vector that represents 32 features, and wherein:

a first of the skip connections extends from a point in the encoder just before a first of the max pooling layers to an output of a final processing segment in the decoder, a second of the skip connections extends from a point in the encoder just before a second of the max pooling layers to a point in the decoder just before a last two of the processing segments in the decoder, a third of the skip connections extends from a point in the encoder just before a third of the max pooling layers to a point in the decoder just before a last four of the processing segments in the decoder, and a fourth of the skip connections extends from a point in the encoder just before a last of the max pooling layers to a point in the decoder just after a first two of the processing segments in the decoder.

7. The computer-based method of claim 1, further comprising applying a version of the aerial image to one or more of a plurality of image classifiers, wherein each image classifier is configured to classify one or more attributes in the aerial image.

8. The computer-based method of claim 1, further comprising:

classifying, with a vegetation overhang classifier, a degree to which vegetation in the aerial image is overhanging the building rooftop identified by the building rooftop deep fully convolutional network;

classifying, with a roof condition classifier, a condition of the building rooftop identified by the building rooftop deep full convolutional network;

classifying, with a roof material classifier, a material of the building rooftop identified by the building rooftop deep fully convolutional network; and/or classifying, with a roof type classifier, a roof type for the building rooftop identified by the building rooftop deep fully convolutional network.

9. The computer-based method of claim 8, wherein classifying the vegetation overhang comprises:

calculating an area of the building rooftop identified and outlined by the second visual indicator in the aerial image;

identifying, with a vegetation overhang deep fully convolutional network, vegetation overhanging the building rooftop identified and outlined by the second visual indicator in the aerial image;

calculating an area of the vegetation overhang identified by the vegetation overhang deep fully convolutional network;

calculating a percentage of the building rooftop covered by the vegetation overhang based on the calculated building rooftop area and the vegetation overhang area; and applying the calculated percentage to decision tree logic to determine the degree to which vegetation in the aerial image is overhanging the building rooftop identified by the building rooftop deep fully convolutional network.

10. The computer-based method of claim 8, wherein classifying the roof condition comprises:

using a building rooftop staining deep convolutional neural network, configured and trained to predict whether staining is present on building rooftops in aerial imagery, to identify a probability that staining is present on the building rooftop identified and outlined by the second visual indicator in the aerial image;

using a building rooftop surface deterioration deep convolutional neural network, configured and trained to predict whether surface deterioration is present on building rooftops in aerial imagery, to identify that surface deterioration is present on the building rooftop identified and outlined by the second visual indicator in the aerial image;

using the probability that staining is present on the building rooftop identified and outlined by the second visual indicator in the aerial image, and the probability that surface deterioration is present on the building rooftop identified and outlined by the second visual indicator in the aerial image to calculate a disrepair index for the building rooftop; and applying the calculated disrepair index to decision tree logic to determine the condition of the building rooftop identified by the building rooftop deep fully convolutional network.

11. The computer-based method of claim 8, wherein classifying the building rooftop material comprises:

using building rooftop material deep convolutional neural networks, configured and trained to identify probabilities that the building rooftop has different types of roof material from aerial imagery, to identify probabilities that the building rooftop includes a plurality of different materials, respectively; and selecting, with a computer-based selector, a top one or two, highest probability roof materials.

12. The computer-based method of claim 8, wherein classifying the building roof type comprises:

using building rooftop type deep convolutional neural networks, configured and trained to identify probabilities that the building rooftop has different possible types from aerial imagery, to identify probabilities that the building rooftop has different types, respectively; and selecting, with a computer-based selector, a top one or two, highest probability roof types.

13. The computer-based method of claim 1, further comprising:

using an above-ground pool deep fully convolutional network, configured and trained to predict the presence of above-ground pools in aerial imagery, to predict whether any above-ground pools are present within the boundary line of the property based on the aerial image; and applying a third visual indicator to the aerial image to identify and outline an above-ground pool in the aerial image identified by the above-ground pool deep fully convolutional network.

14. The computer-based method of claim 13, further comprising:
using an in-ground pool deep fully convolutional network, configured and trained to predict the presence of in-ground pools in aerial imagery, to predict whether any in-ground pools are present within the boundary line of the property based on the aerial image; and
applying a fourth visual indicator to the aerial image to identify and outline an in-ground pool in the aerial image identified by the in-ground pool deep fully convolutional network.

15. The computer-based method of claim 14, further comprising:
using a trampoline deep fully convolutional network, configured and trained to predict the presence of trampolines in aerial imagery, to predict whether any trampolines are present within the boundary line of the property based on the aerial image; and
applying a fifth visual indicator to the aerial image to identify and outline a trampoline in the aerial image identified by the trampoline deep fully convolutional network.

16. The computer-based method of claim 15, wherein the above-ground pool deep fully convolutional network, the in-ground pool deep fully convolutional network, and the trampoline deep fully convolutional network have identical configurations but use different weights.

17. A computer-based method comprising:
receiving, at a computer-based system, an aerial image of a property that includes a first visual indicator on the aerial image that follows and identifies a boundary line for the property;
using a building rooftop deep fully convolutional network, configured and trained to predict the presence of building rooftops in aerial imagery, to predict whether any building rooftops are present within the boundary line of the property based on the aerial image;
applying a second visual indicator to the aerial image to identify and outline a building rooftop in the aerial image identified by the building rooftop deep fully convolutional network,
providing an above-ground pool deep fully convolutional network, an in-ground pool deep fully convolutional network, and a trampoline deep fully convolutional network,
wherein each of the above-ground pool deep fully convolutional network, the in-ground pool deep fully convolutional network, and the trampoline deep fully convolutional network comprises:
an encoder,
a decoder, and
a plurality of skip connections that extend from various points in the encoder to the decoder,
wherein the encoder comprises:
an input,
a normalization layer, and
ten processing segments; and
wherein the decoder comprises:
eight processing segments; and
an output,
wherein every processing segment in the encoder and decoder comprises:
a convolution layer,
a batch normalization layer; and
an exponential linear unit (elu) layer, and
wherein every other processing segment in the encoder, starting with a second processing segment in the encoder, has a max pooling layer.

18. The computer-based method of claim 17, wherein:
each of the first two convolution layers in the encoder is associated with a feature vector that represents 16 features,
each of the next two convolution layers in the encoder is associated with a feature vector that represents 32 features,
each of the next two convolution layers in the encoder is associated with a feature vector that represents 64 features,
each of the next two convolution layers in the encoder is associated with a feature vector that represents 128 features,
each of the next two convolution layers in the encoder is associated with a feature vector that represents 256 features, and
wherein:
each of the first two convolution layers in the decoder is associated with a feature vector that represents 128 features,
each of the next two convolution layers in the decoder is associated with a feature vector that represents 64 features,
each of the next two convolution layers in the decoder is associated with a feature vector that represents 32 features, and
the last two dilated convolution layers in the decoder are associated with a feature vector that represents 16 features, and
wherein:
a first of the skip connections extends from a point in the encoder just before a first of the max pooling layers to an output of a final processing segment in the decoder,
a second of the skip connections extends from a point in the encoder just before a second of the max pooling layers to a point in the decoder just before a last two of the processing segments in the decoder,
a third of the skip connections extends from a point in the encoder just before a third of the max pooling layers to a point in the decoder just before a last four of the processing segments in the decoder, and
a fourth of the skip connections extends from a point in the encoder just before a last of the max pooling layers to a point in the decoder just after a first two of the processing segments in the decoder.

19. The computer-based method of claim 1, further comprising:
enabling a first human annotator to annotate the received image, at a computer-based user terminal, to specify whether visual inspection by the first human annotator revealed, in the aerial image, any building rooftops, in-ground pools, above-ground pools, trampolines, skylights, solar panels, vegetation overhang, staining, surface deterioration, specific roof materials, and/or specific roof types; and
comparing the annotation(s) made by the first human annotator to any determinations or predictions made by the computer-based system.

20. The computer-based method of claim 19, further comprising:
if the comparison reveals a discrepancy between the annotations made by the first human annotator and the determinations or predictions made by the computer-based system, presenting the aerial image to a second human annotator who is different than the first human annotator.

21. The computer-based method of claim 1, further comprising:
masking and resizing the aerial image prior to using the building rooftop deep fully convolutional network to predict whether any building rooftops are present within the boundary line of the property based on the aerial image.

22. The computer-based method of claim 21, wherein masking and resizing is performed for all property and rooftop segmentation deep fully convolutional network models.

23. The computer-based method of claim 1, wherein using the building rooftop deep fully convolutional network produces a probability image version of the aerial image, wherein the probability image is a pixel-by-pixel representation of whether the aerial image shows a building rooftop.

24. The computer-based method of claim 23, wherein all property and rooftop segmentation deep fully convolutional network models produce a probability image version of the areal image.

25. The computer-based method of claim 23, further comprising:
thresholding and resizing the probability image; and
applying connected components analysis and an area filter to produce a final output that is a version of the aerial image that includes the second visual indicator identifying and outlining the building rooftop in the aerial image.

26. The computer-based method of claim 25, wherein all property and rooftop segmentation deep fully convolutional network models threshold and resize the probability image and apply connection components and area filtering to produce a final output.

27. A computer-based method comprising:
receiving, at a computer-based system, an aerial image of a property that includes a first visual indicator on the aerial image that follows and identifies a boundary line for the property;
using a building rooftop deep fully convolutional network, configured and trained to predict the presence of building rooftops in aerial imagery, to predict whether any building rooftops are present within the boundary line of the property based on the aerial image;
applying a second visual indicator to the aerial image to identify and outline a building rooftop in the aerial image identified by the building rooftop deep fully convolutional network,
wherein the building rooftop deep fully convolutional network comprises:
an encoder,
a decoder, and
a plurality of skip connections that extend from various points in the encoder to the decoder,
wherein the encoder comprises:
an input,
a normalization layer, and
ten processing segments; and
wherein the decoder comprises:
eight processing segments; and
an output,
wherein every processing segment in the encoder and decoder comprises:
a dilated convolution layer,
a batch normalization layer; and
an exponential linear unit (elu) layer, and
wherein every other processing segment in the encoder, starting with a second processing segment in the encoder, has a max pooling layer.

28. The computer-based method of claim 27, wherein:
each of the first two dilated convolution layers in the encoder is associated with a feature vector that represents 64 features and a 2×2 dilation kernel,
each of the next two dilated convolution layers in the encoder is associated with a feature vector that represents 128 features and a 4×4 dilation kernel,
each of the next two dilated convolution layers in the encoder is associated with a feature vector that represents 256 features and an 8×8 dilation kernel,
each of the next two dilated convolution layers in the encoder is associated with a feature vector that represents 512 features and a 16×16 dilation kernel,
each of the next two dilated convolution layers in the encoder is associated with a feature vector that represents 1024 features using a 32×32 dilation kernel, and
wherein:
each of the first two dilated convolution layers in the decoder is associated with a feature vector that represents 512 features and a 16×16 dilation kernel,
each of the next two dilated convolution layers in the decoder is associated with a feature vector that represents 256 features and a 8×8 dilation kernel,
each of the next two dilated convolution layers in the decoder is associated with a feature vector that represents 128 features and a 4×4 dilation kernel, and
the last two dilated convolution layers in the decoder are associated with a feature vector that represents 64 features and a 2×2 dilation kernel, and
wherein:
a first of the skip connections extends from a point in the encoder just before a first of the max pooling layers to an output of a final processing segment in the decoder,
a second of the skip connections extends from a point in the encoder just before a second of the max pooling layers to a point in the decoder just before a last two of the processing segments in the decoder,
a third of the skip connections extends from a point in the encoder just before a third of the max pooling layers to a point in the decoder just before a last four of the processing segments in the decoder, and
a fourth of the skip connections extends from a point in the encoder just before a last of the max pooling layers to a point in the decoder just after a first two of the processing segments in the decoder.

29. A computer-based system comprising:
a network interface connection for receiving a plurality of aerial images from a data source over a network, wherein each image has a first visual indicator on the aerial image that follows and identifies a boundary line for the property;
a building rooftop deep fully convolutional network, configured and trained to predict the presence of building rooftops in aerial imagery, and apply a second visual indicator to the aerial image to identify and outline a building rooftop in the aerial image identified by the building rooftop deep fully convolutional network, and
an additional deep fully convolutional network, configured and trained to predict the presence of an additional property feature in aerial imagery, and predict whether said additional property feature is present with the boundary line of the property based on the aerial image, wherein the building rooftop and additional deep convolutional networks have identical configurations but use different weights.

* * * * *